United States Patent [19]

Aoyama et al.

[11] Patent Number: 5,202,085

[45] Date of Patent: Apr. 13, 1993

[54] FUEL ASSEMBLY AND REACTOR CORE

[75] Inventors: Motoo Aoyama, Mito; Taro Ueki, Hitachi; Akinobu Nakajima, Hitachi; Sadao Uchikawa, Katsuta; Junichi Yamashita, Hitachi, all of Japan

[73] Assignee: Hitachi, Ltd., Tokyo, Japan

[21] Appl. No.: 760,964

[22] Filed: Sep. 17, 1991

[30] Foreign Application Priority Data

Sep. 19, 1990 [JP] Japan .................................. 2-249108

[51] Int. Cl.$^5$ .............................................. G21C 3/32
[52] U.S. Cl. .................................... 376/435; 376/428; 376/447; 376/434
[58] Field of Search ............... 376/428, 434, 435, 447; 976/DIG. 196, DIG. 201

[56] References Cited

U.S. PATENT DOCUMENTS

| | | | |
|---|---|---|---|
| 2,998,367 | 8/1961 | Untermyer | 376/435 |
| 3,212,983 | 10/1965 | Kornbichler | 376/435 |
| 3,802,995 | 4/1974 | Fritz et al. | 376/435 |
| 4,914,678 | 4/1990 | Koyama et al. | 376/267 |
| 4,968,479 | 11/1990 | Ogiya et al. | 376/428 |
| 5,068,082 | 11/1991 | Ueda et al. | 376/428 |

Primary Examiner—Donald P. Walsh
Assistant Examiner—Meena Chelliah
Attorney, Agent, or Firm—Antonelli, Terry, Stout & Kraus

[57] ABSTRACT

A fuel assembly has a plurality of first fuel rods and a plurality of second fuel rods having a shorter length in an axial direction than the first fuel rods. The second fuel rod is loaded with natural uranium in full length of its effective fuel length portion. The fuel assembly has a water rod having a larger horizontal cross sectional area at the upper region than the area at the lower region. The second fuel rods are arranged downward of the upper region of the water rod and adjacent to the lower region of the water rod. The width of the horizontal cross sectional area of the lower region of the water rod is set so as to locate the minimum values of both thermal neutron flux and resonance neutron flux in the horizontal direction of the fuel assembly at an outer side with respect the location of the second fuel rod in the horizontal direction. In accordance with the present invention, the H/U ratio in the axial direction becomes close to the optimum value, and increment of the resonance neutron absorption and flattening of the thermal neutron flux in the horizontal direction are achieved.

24 Claims, 17 Drawing Sheets

FIG. 9
FIG. 11
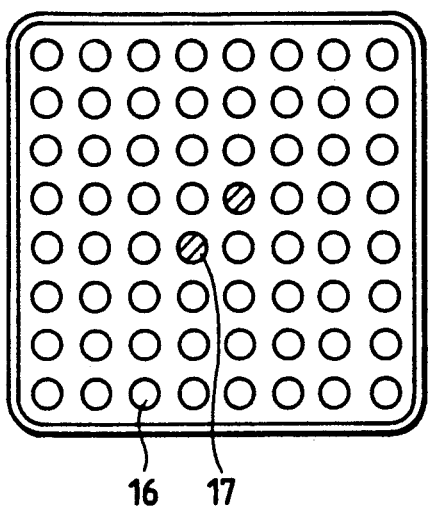
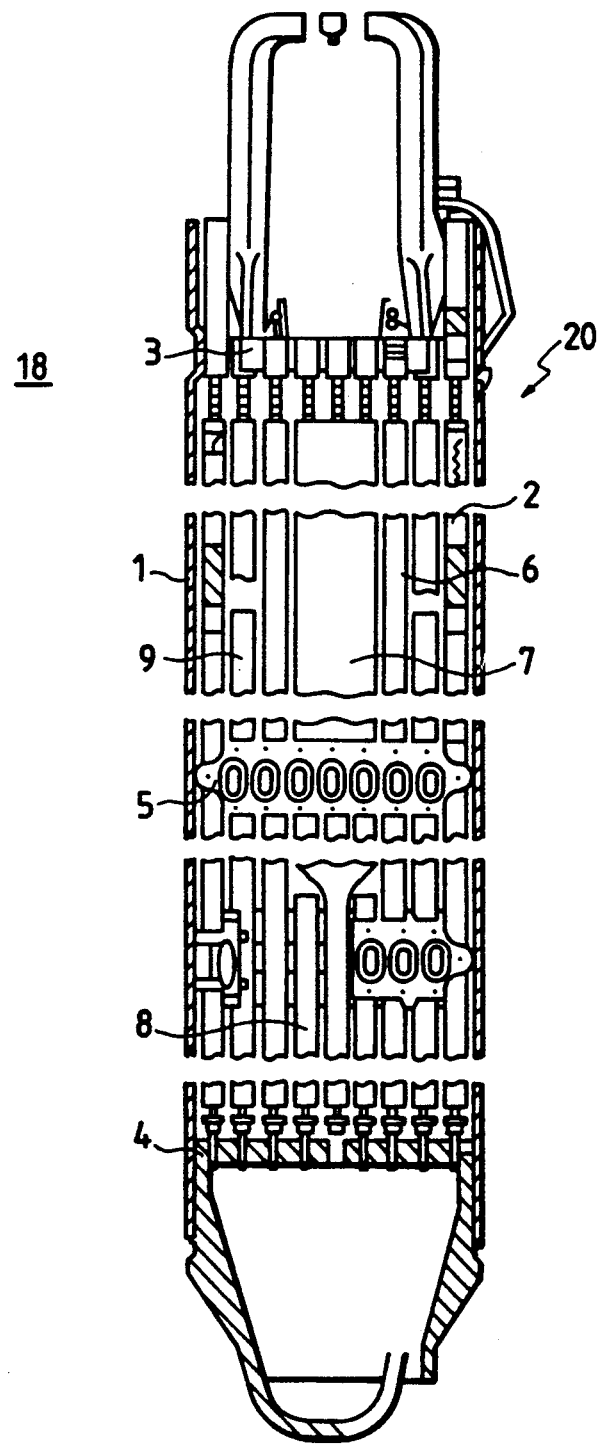

REACTOR CORE RADIAL DIRECTION

FUEL ASSEMBLY AND REACTOR CORE

BACKGROUND OF THE INVENTION

The present invention relates to a fuel assembly, a reactor core, and a method for loading of the fuel assembly, especially, relates to the preferable fuel assembly being loaded in boiling water type nuclear reactors (hereinafter called BWR) for increment of reactor shut down margin, improvement of fuel economy, and maintenance of reactivity control, and relates to the preferable reactor core loaded with the fuel assemblies and the preferable method for loading of the fuel assembly.

A conventional fuel assembly which is used in a BWR is generally composed of a plurality of fuel rods and one or a plurality of water rods which are arranged in a channel box by being supported at an upper end and a lower end of the fuel rod and the water rod with an upper tie plate and a lower tie plate.

During operation of the reactor, slightly unsaturated cooling light water enters from a hole of the lower tie plate into an interval among the fuel rods in the fuel assembly, and flows out from a hole of the upper tie plate as vapor-liquid two phase flow after being heated by the fuel rods and boiled during flow from lower portion to upper portion of the fuel rod interval. As the result, void fraction of the coolant increases from 0% at the lower portion to about 70% at the upper portion of the fuel assembly. Consequently, the ratio of hydrogen atoms to heavy metal atoms; that is, the ratio of moderator to fuel (H/U ratio), which is an important factor for determining of nuclear characteristics of the fuel assembly alters remarkably depending on a position in an axial direction.

On the other hand, it is necessary to install control rods and instrument tubes for neutron detectors exterior of the channel box in the BWR and, therefore, such intervals (hereinafter called water gap) as to enable the above mentioned rods and tubes be inserted are provided between the fuel assemblies. The water gap is filled with saturated water and, consequently, effects of the saturated water existing in the water gap to the fuel rods in the fuel assembly are different depending on whether the fuel rods locate at periphery of the fuel assembly (a region near the water gap) or central region of the fuel assembly. That is, the peripheral region of the fuel assembly near the water gap has larger H/U ratio than the central region. Accordingly, such H/U ratio as an important factor for determining the nuclear characteristics of the fuel assembly differs depending on the radial position in the fuel assembly.

The H/U ratio is a parameter to determine an average energy of a neutron. As the ratio becomes larger, the average energy of the neutron becomes smaller (softer neutron spectrum), and the nuclear fission reaction with nuclear fissile material is enhanced. Concurrently, the softening of neutron spectrum increases the neutron absorbing reaction by the moderator (light water as coolant) as well as the nuclear fission reaction. Accordingly, there is an optimum H/U ratio in view of fuel economy. Moreover, fuel rod power generation which depends on the reactivity of nuclear fission is determined by the H/U ratio. That is, in view of thermal margin and controlability of excess reactivity of the fuel assembly, it is necessary to consider the H/U ratio.

On the other hand, with related to conventional nuclear reactors, extension of an operation cycle of the reactor and high burn up of fuel are considered for increasing of a plant utilization factor and effective utilization of uranium resources. For increasing of discharged burn up of the fuel assembly, it is necessary to increase enrichment of the fuel assembly. The increment of the fuel enrichment influences the optimum H/U ratio. Further, the extension of loading period of the fuel assembly in the reactor means that the fuel is effected under different H/U ratios for a long period in the reactor, and the above mentioned influence of the H/U ratio is enhanced.

In regard to improvement of distribution of the H/U ratio in a radial direction and an axial direction of the fuel assembly, there are such methods as enlarging of a saturated water region at a necessary portion and regulation of distribution of the nuclear fissile material. The former is a method for improving the H/U ratio by enlarging the saturated water region at the central and the upper region of the fuel assembly, wherein moderating effect of the neutron is deteriorated. And the latter is a method for improving the H/U ratio in the axial direction by regulation of loading quantity of the fuel.

For example, in JP-A-62-211584 (1987), a method to increase horizontal cross sectional area at the upper region in the axial direction of the fuel assembly and to arrange a water rod having a horizontal cross section of cruciform at the upper region in the axial direction is proposed. Short length fuel rods are loaded beneath the cruciform protruded region of the cruciform water rod.

And, in JP-A-52-50498 (1977), a method to arrange fuel rods having different length in order to form a flow channel of coolant having reversely tapered shape toward the upper region in the axial direction of the center of the fuel assembly is disclosed.

In USP-4,968,479, a fuel assembly for achieving high burn up by increasing of fuel enrichment is disclosed. The fuel assembly is composed of a water rod having larger horizontal cross sectional area at the upper region in the axial direction than the area at the lower region and of fuel rods having three kinds of different length in order to reduce an increment of local power peaking accompanying with using of the highly enriched fuel with a burnable poison at the beginning of operation and to optimize a reactivity distribution at the upper and the lower region of the fuel assembly during a designated operation period. The shortest fuel rod is arranged at the position adjacent to the lower small diameter region of the water rod, and contains fuel having equal to or lower enrichment than the fuel assembly average enrichment, the medium length fuel rod contains fuel having equal to the fuel assembly average enrichment, and a part of the longest fuel rods contain fuel having the burnable poison (column 15, line 25–60, FIG. 22, 30B–30D).

Further, in JP-A-63-311195 (1988), on a fuel assembly for achieving high burn up by increment of fuel enrichment, an improving method for increasing the reactor shut down margin in considering that the increasing of the enrichment at the upper region of the fuel assembly increases the reactivity of the upper region at the reactor shut down margin is disclosed. The fuel assembly improved by the above described method has two water rods each of which have a large diameter and uniform horizontal cross section in the axial direction and fuel rods, which are arranged adjacent to the two large diameter water rods, containing lower enriched fuel at least at the upper region of the fuel rod than the fuel in other next fuel rods.

Other prior techniques relating to the increment of burn up are disclosed in USP-4,229,258, JP-A-63-21589 (1988), and JP-A-64-28587 (1989). In USP-4,229,258, a fuel assembly having higher enriched fuel at the upper region than at the lower region is disclosed. In JP-A-63-21589 (1988), a fuel assembly in which high enriched fuel rods are arranged at the outermost periphery in the horizontal cross section and the enrichment at the lower region in the axial direction of the fuel rods is higher than the enrichment at the upper region is disclosed. In JP-A-6428587 (1989), a fuel assembly in which enrichment of fuel pellets in fuel rods containing enriched uranium and gadolinium is the highest in the fuel assembly and the effective fuel length of the fuel rod is shorter than the length of fuel rods containing enriched uranium but not gadolinium is described.

Further, in JP-A-53-43193 (1978), a conventional method in which the saturated water region at the upper region of the fuel assembly is increased by making the thickness of the channel box wall thin at the upper region of the fuel assembly is disclosed.

Among above described prior techniques, the conventional method disclosed in JP-A-63-311195 (1988), wherein large water rods having uniform horizontal cross section in the axial direction are used, improves the distribution of the moderator to fuel ratio (H/U ratio) at the upper region of the fuel assembly. Nevertheless, the improvement of the distribution of the H/U ratio at the lower region of the fuel assembly is not considered in the conventional method.

In accordance with the prior art wherein the improvement of the H/U ratio distribution in the axial direction of the fuel assembly is aimed at, the characteristics at the lower region of the fuel assembly is sacrificed for the improvement of the H/U ratio distribution in the axial direction and, consequently, the improvement of the H/U ratio distribution in the radial direction at the lower region of the fuel assembly is not sufficient. And the distribution of the moderator and fuel materials (fissile materials and parent materials) in the axial and the radial direction is not considered sufficiently in the prior art.

That is, in the methods disclosed in JP-A-62-211584 (1987), JP-A-52-50498 (1977), and USP-4,968,479, the horizontal cross sectional area of water rod or moderator flow channel at the upper region in the axial direction of the fuel assembly is made larger than the area at the lower region in order to increase the H/U ratio at the upper region of the fuel assembly. But the methods have such problems that the cross sectional area of the water rod at the lower region is not sufficient, and flattening of thermal neutron flux distribution is not achieved sufficiently. The problems cause lowering of the fuel economy.

Moreover, in the methods disclosed in JP-A-62-211584 (1987) and JP-A-52-50498 (1977), when the enrichment of the short fuel rods arranged in a region which is yielded by decreasing of H/U ratio at the lower region of the fuel assembly is excessively high, fissile materials are generated more at the lower region than at the upper region of the fuel assembly and, consequently, a large peak in power distribution is caused at the lower region of the fuel assembly. Accordingly, there are such problems that stability becomes insufficient and fuel economy is lowered by increasing of average void fraction in the axial direction of the fuel assembly.

SUMMARY OF THE INVENTION

One of the objects of the present invention is to provide a fuel assembly for improving fuel economy by making the moderator to fuel ratio, which alters depending on the position in the fuel assembly, close to the optimum value as possible everywhere including the lower portion of the fuel assembly, a reactor core using the fuel assembly, and a method of usage of the fuel assembly thereof.

Another object of the present invention is to provide a fuel assembly for improving fuel economy and controlability of excess reactivity by optimizing the distribution of fuel materials and moderators in the axial and radial direction of the fuel assembly, a reactor core using the fuel assembly, and a method of usage of the fuel assembly thereof.

The feature of the present invention is to provide a fuel assembly comprising a plurality of first fuel rods, a means for moderating which is surrounded with the first fuel rods and have larger horizontal cross sectional area at upper region in the axial direction than the area at lower region, and second fuel rods which are arranged at adjacent to the lower region of the means for moderating and have lower enriched fuel than the horizontal cross sectional average enrichment of the fuel assembly, characterized in that the horizontal cross sectional area at the lower region of the means for moderating is so determined that both of the minimum values of thermal neutron flux distribution and resonance neutron flux distribution in the vertical direction to the longitudinal axis of the fuel assembly are located at an exterior region to the second fuel rod in the vertical direction to the longitudinal axis.

The horizontal cross sectional area of the means for moderating at the lower region is preferably larger than sum of the two first fuel rods.

The enrichment of the fuel contained in the second fuel rod is preferably lower than 0.7 of the average enrichment at horizontal cross section of the fuel assembly, and more preferably, lower than 0.5 of the average enrichment at horizontal cross section of the fuel assembly. The second fuel rod contains, for example, natural uranium.

The second fuel rod is a short length fuel rod which is preferably arranged adjacent to the lower region of the means for moderating, and the length of the fuel rod is preferably less than a half of the effective fuel length of the first fuel rod.

Further, the means for moderating is preferably a water rod having wider horizontal cross sectional area at the upper region than the area at the lower region. And the means for moderating is able to be composed of a water rod having an uniform horizontal cross sectional area along the axial direction and a coolant flow channel which surrounds the upper region of the water rod, and is able to be composed of a water rod having an uniform horizontal cross sectional area along the axial direction and a plurality of solid moderating rods which surround the upper region of the water rod.

In order to achieve the objects, the present invention provides a reactor core loaded with the above described fuel assemblies.

The reactor core preferably has at least a central region and a peripheral region, and the fuel assemblies are arranged more in the central region than in the peripheral region.

Further, for achieving the objects, the present invention provides a method of usage of the fuel assemblies characterized in that the fuel assemblies are loaded more in the central region than in the peripheral region at fuel exchange.

The distribution of the moderator to fuel ratio in the axial direction of the fuel assembly and in the vertical direction to the axis at the upper region of the fuel assembly are improved respectively by arranging a means for moderating having larger horizontal cross sectional area at the upper region in the axial direction than at the lower region. And, increment of resonance neutron flux absorbing effect and flattening of thermal neutron flux in the radial direction are achieved by arranging the second fuel rods containing lower enriched fuel than the average enrichment in horizontal cross section of the fuel assembly adjacent to the means for moderating, and determining of the horizontal cross sectional area of the means for moderating at the lower region in the axial direction of the fuel assembly so that the minimum value of both the thermal neutron flux distribution and the resonance neutron flux distribution in the vertical direction to the axis are located at an exterior region to the second fuel rod in the vertical direction to the axis and, accordingly, the fuel economy and the controlability of excess reactivity are improved.

By the present invention, as the moderator, the fissile material, and the fertile material are optimally arranged in the axial direction and vertical direction to the axis of the fuel assembly, the moderator to fuel ratio comes close to the optimum value at everywhere of the fuel assembly including the lower region and, consequently, the increment of resonance neutron flux absorbing effect and thermal neutron flux flattening in the vertical direction to the axis are able to be utilized, and the effects of improving the fuel economy, the controlability of the excess reactivity, and the thermal margin are realized.

BRIEF DESCRIPTION OF THE DRAWINGS

FIG. 9 is a sectional view of a conventional fuel assembly cited for comparison;

FIG. 11 is a schematic vertical cross sectional view of the fuel assembly of the first embodiment of the present invention;

DETAILED DESCRIPTION OF THE EMBODIMENTS

Figure 1:
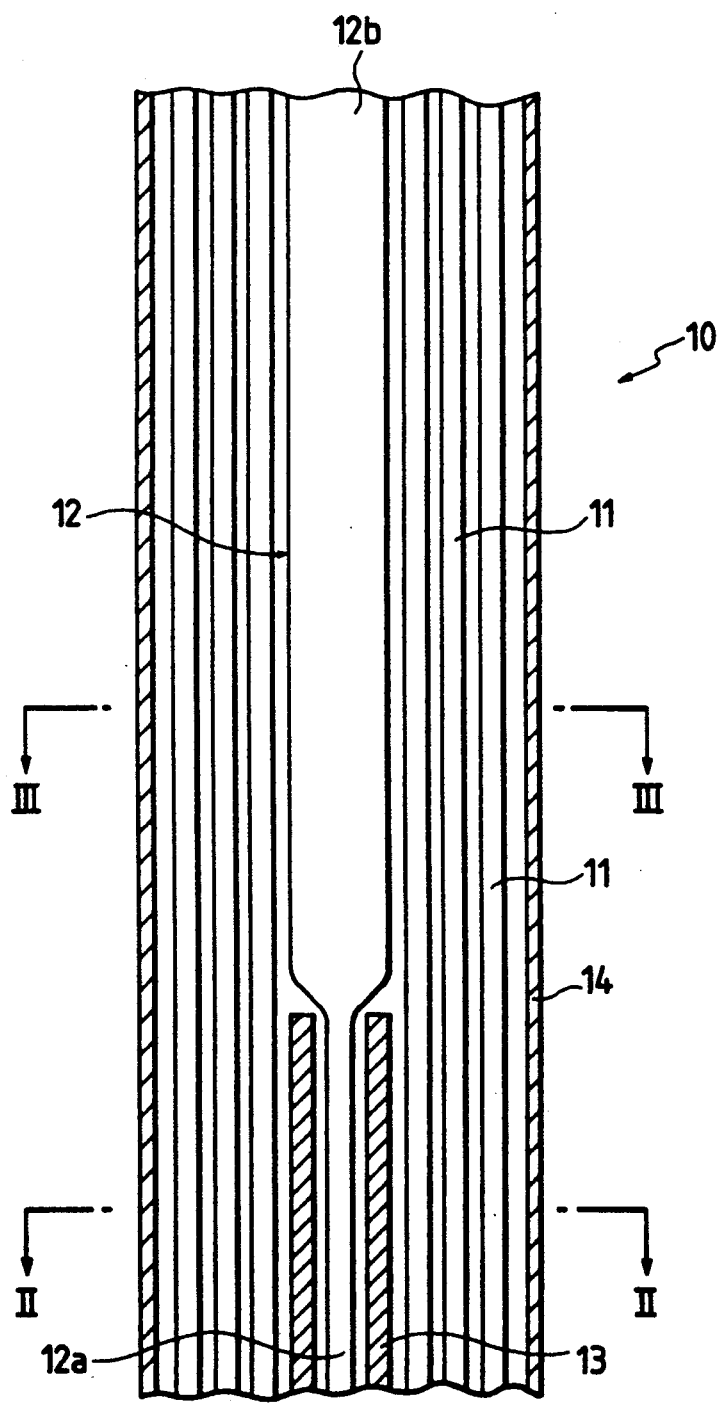
FIG. 1 is a schematic illustration of an effective fuel length region of a fuel assembly for explanation of the theory of the present invention.

Hereinafter, the theory and embodiments of the present invention are explained referring to the drawings.

Theory of the Present Invention

First, the theory of the present invention is explained referring to FIGS. 1-10.

Figure 2:
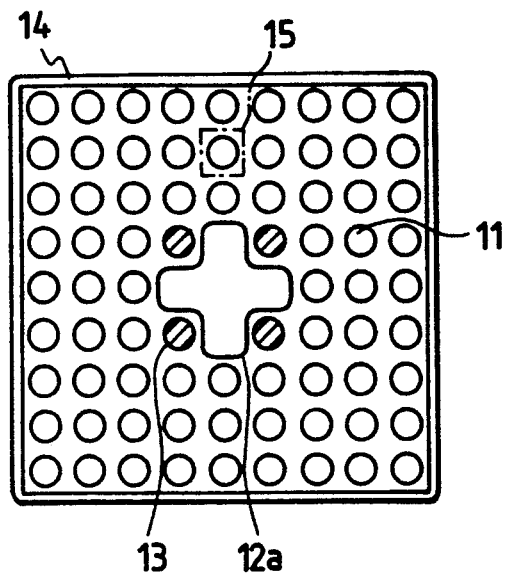
FIG. 2 is a sectional view of II—II section in FIG. 1.
Figure 3:
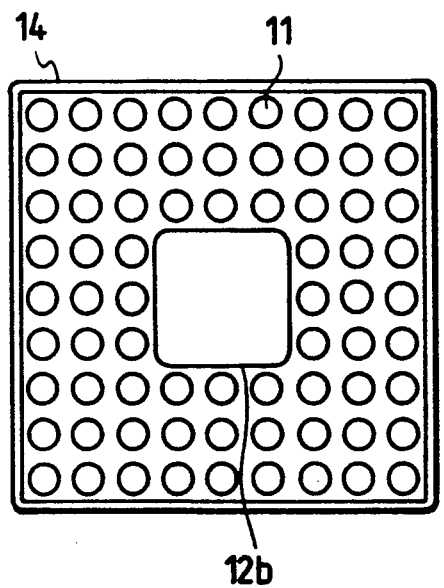
FIG. 3 is a sectional view of III—III section in FIG. 1.

A fuel assembly used in the explanation of the theory of the present invention is represented in FIGS. 1-3. The fuel assembly has a fuel rod arrangement in a 9 rows by 9 columns lattice (hereinafter called 9×9 lattice) instead of a 8 rows by 8 columns lattice (hereinafter called 8×8 lattice) in consideration of increasing the maximum linear power density by increment of power peaking accompanying with high burn up of the fuel. Hereinafter, the fuel assembly having a 9×9 lattice is taken as an example in the explanation of the theory of the present invention, but the present invention is also applicable to a 10×10 lattice and a 11×11 lattice as well. Further, if a fuel rod which reduces interaction between the fuel pellet and the cladding of the fuel rod is developed, the present invention is also applicable to a conventional fuel assembly having a 8×8 lattice.

In accordance with FIGS. 1-3, the fuel assembly 10 has a plurality of fuel rods 11 arranged in a 9×9 square lattice, and a water rod 12 which is surrounded with the fuel rods 11 and is arranged at the central region in the horizontal section of the fuel assembly. One of imaginary square lattices in the 9×9 lattice which defines the arrangement of the fuel rods 11 is illustrated by a one dot dashed line 15 in FIG. 2. The imaginary square lattice 15 is drawn by connecting the middle points of an interval between adjacent fuel rods with a line which is parallel to the arrangement of the fuel rods. In this specification, the imaginary square lattice 15 is conveniently called a "fuel unit cell" hereinafter.

The water rod 12, comprising the upper region 12b and the lower region 12a each of which has different cross sectional area, has a cruciform horizontal cross section which occupies a region equivalent to five fuel unit cells at the lower region 12a in the axial direction as illustrated in FIG. 2, and a square horizontal cross section which occupies a region equivalent to nine fuel unit cells at upper region 12b in the axial direction as illustrated in FIG. 3. The upper region 12b is located above the lower region 12a in the axial direction.

The fuel assembly 10 further has four short length fuel rods 13 arranged at the adjacent regions to the lower region 12a beneath the horizontally extended region (the region having larger area than the cross sectional area at the lower region 12a) at the upper region of the water rod 12, that is, at the four corner regions of the central region wherein fuel rods including the water rod 12 are able to be arranged in a 3 rows by 3 columns lattice. The short length fuel rod 13 is a low enriched fuel rod containing low enriched uranium having a large percentage of uranium-238 such as natural uranium, depleted uranium, and reprocessed uranium as fuel materials. The fuel rods 11, 13, and the water rod 12 are surrounded with the channel box 14 at the outermost periphery. The above described horizontal direction means the vertical direction to the axis of the fuel assembly 10 in the condition that the fuel assembly 10 is loaded into the reactor core. The meaning is same in the explanation hereinafter.

Operation and effect of the fuel assembly 10 composed of the above described manner is as follows.

First, the fuel assembly 10 is improved in the distribution of the moderator to fuel ratio (H/U ratio) in the axial direction by being made the horizontal cross sectional area larger at the upper region 12b of the water rod 12 than the area at the lower region 12a. And, during operation of the reactor, the above described water gap is formed at the exterior of the channel box 14. The distribution of the H/U ratio in the horizontal direction at the upper region of the fuel assembly 10 is improved by being made the upper region 12b of the water rod 12 have such shape as to have large cross sectional area as represented in FIG. 3.

Second, absorbing effect of the resonance neutron flux is increased and flattening of the thermal neutron flux in the horizontal direction is achieved by making the water region area in the cross section at the lower region 12a of the water rod 12 larger than the area equivalent to sum of the two fuel rods, and arranging the low enriched fuel rods 13 adjacent to the water region. Consequently, the fuel economy is increased and the controlability of excess reactivity is improved.

Details on the second effect is explained hereinafter.

The lower region 12a is arranged in the central region of the fuel assembly 10 for flattening of power distribution in the horizontal direction of the fuel assembly 10. Neutrons having high energy groups which are generated by fission reaction are uniformly distributed in the fuel assembly because of long mean free path. On the other hand, the area of the water gap and the water rod becomes the source of neutrons having resonance energy groups and, especially, neutrons having thermal energy groups, because of large moderating effect for neutrons.

Figure 4:
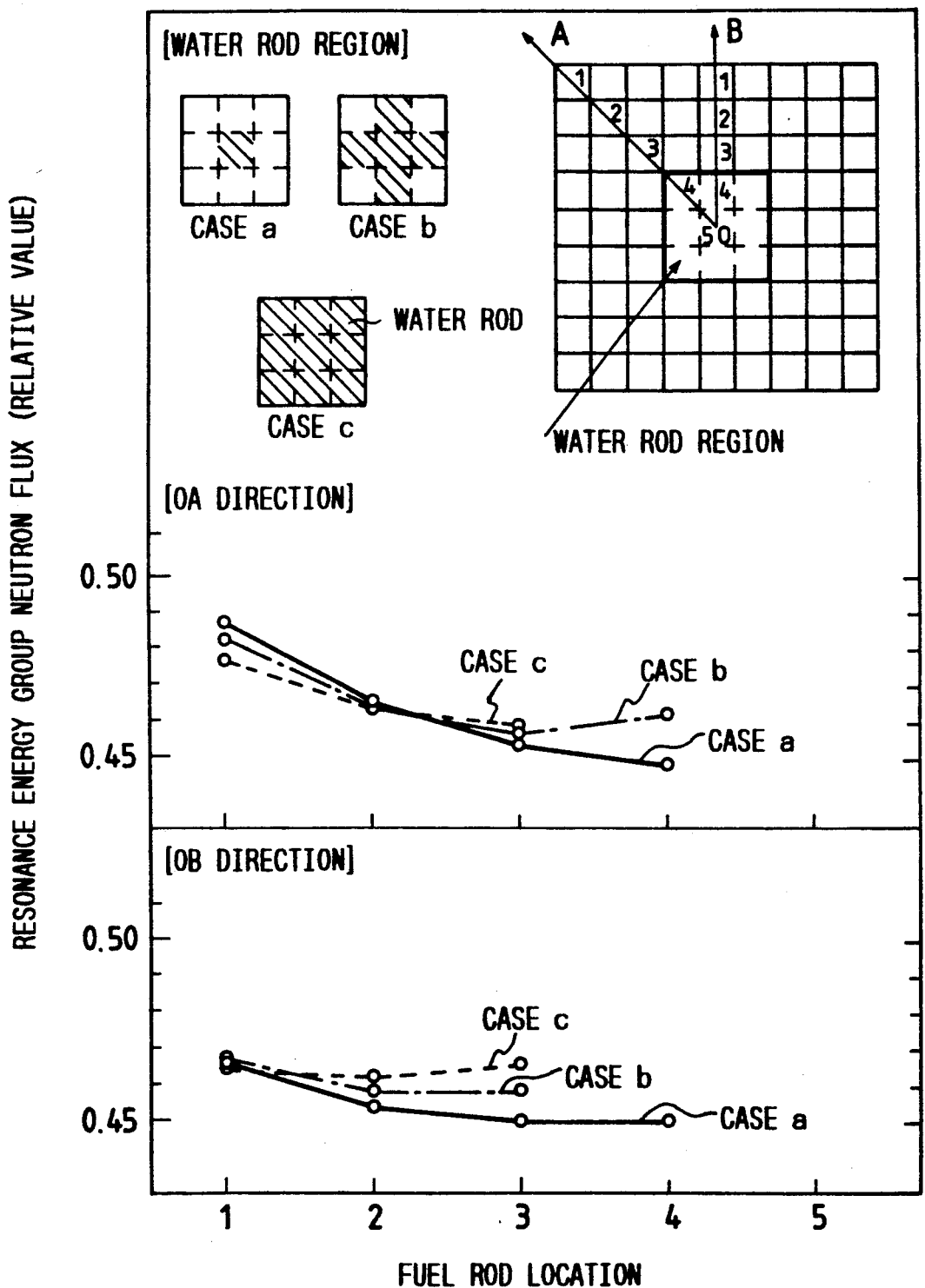
FIG. 4 is a graph representing the effect of wideness of water rod region on distribution of resonance neutron flux in a fuel assembly.
Figure 5:
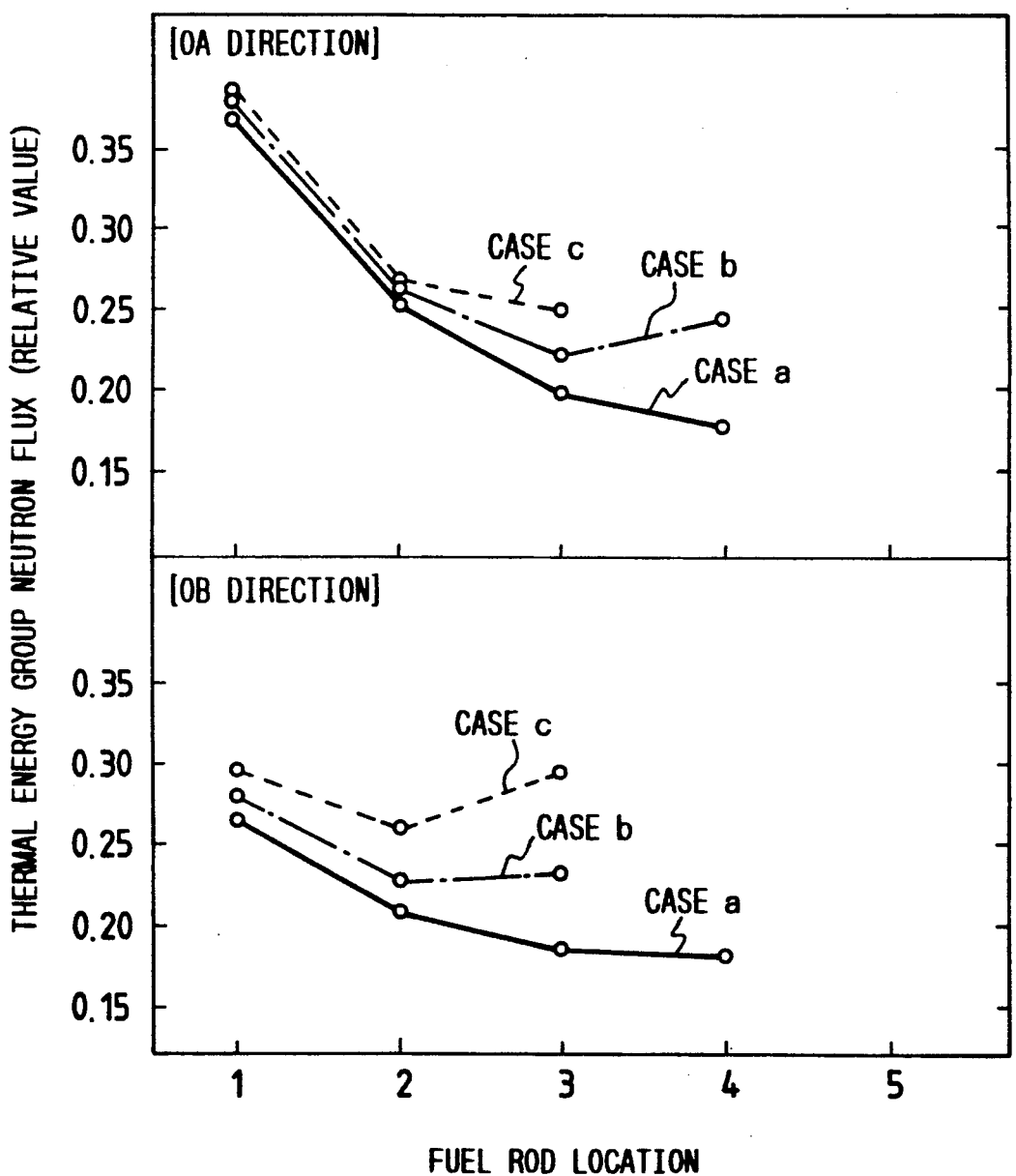
FIG. 5 is a graph representing the effect of wideness of water rod region on distribution of thermal neutron flux in a fuel assembly.

In FIGS. 4 and 5, the result of the examination on the effect of wideness of the cross sectional area of the water rod to the distribution of the resonance neutron flux and of the thermal neutron flux are presented. The case a used the water rod of which cross sectional area was equivalent to the area of one fuel unit cell, the case b used the water rod 12 having the upper region 12b and the lower region 12a, and the case c used the water rod of which cross sectional areas was equivalent to the sum of nine fuel unit cells, that is, as same as the upper region 12b of the above described water rod 12. In the case a to c in FIGS. 4 and 5, the hatched regions represent the cross sectional shape of the water rod. In all cases, the fuel rods had fuels of same enrichment.

In FIG. 4, the cross sectional area of the water rod of the case a is equivalent to only one fuel unit cell. Therefore, the case a had weak function as a source for resonance energy group neutrons and the value of the resonance neutron flux at the fuel unit cell position "4" adjacent to the water rod is small. While, in the case b, the value of the resonance neutron flux at the same position "4" is large, and the minimum value in the resonance neutron flux distribution in the horizontal direction exists at the fuel unit cell position "3" which locates more exterior side than the position "4". In the case c, far larger value of the resonance neutron flux is obtained at the position "3".

In FIG. 5, the case a had weak function as a source for thermal energy group neutrons, and the value of the thermal neutron flux at the fuel unit cell position "4" adjacent to the water rod is small. While, in the case b, the value of the thermal neutron flux at the same position "4" is large, and the minimum value in the thermal neutron flux distribution exists also at the fuel unit cell position "3" which locates more exterior than the position "4". In the case c, far larger value of the thermal neutron flux is obtained at the position "3".

According to the above described results of the examination, the inventors of the present invention newly found that the water rod region has an effect to be a source for the neutrons of resonance energy groups and thermal energy groups, the neutron source effect is especially large on the thermal energy groups neutron, the water rod in the case a having the cross sectional area equivalent to only one fuel unit cell is insufficient in order not to make the resonance neutron flux and the thermal neutron flux minimum at the fuel unit cell location adjacent to the water rod, and each of the minimum values in the horizontal distribution of thermal neutron flux and resonance neutron flux is located at more exterior region in the horizontal direction than the fuel unit cell location adjacent to the water rod by arranging of the water rod having the cross sectional area of more than sum of the two fuel rods.

The present invention is based on the above described findings. The minimum values in horizontal distribution of both the thermal neutron flux and the resonance neutron flux are located at the more exterior location in the horizontal direction than the location of the low enriched fuel rod 13 by making the horizontal cross sectional area of the lower region 12a at least equal to or larger than the area equivalent to the region for the two fuel rods. Consequently, a sufficient amount of resonance neutron flux for conversion of uranium-238 to plutonium-239 is certainly obtained at the location of the low enriched fuel rod 13, and it becomes possible to increase the thermal neutron flux effectively at the location of the fuel rod 11 where is more exterior side in the horizontal direction than the location of the fuel rod 13.

Figure 6:
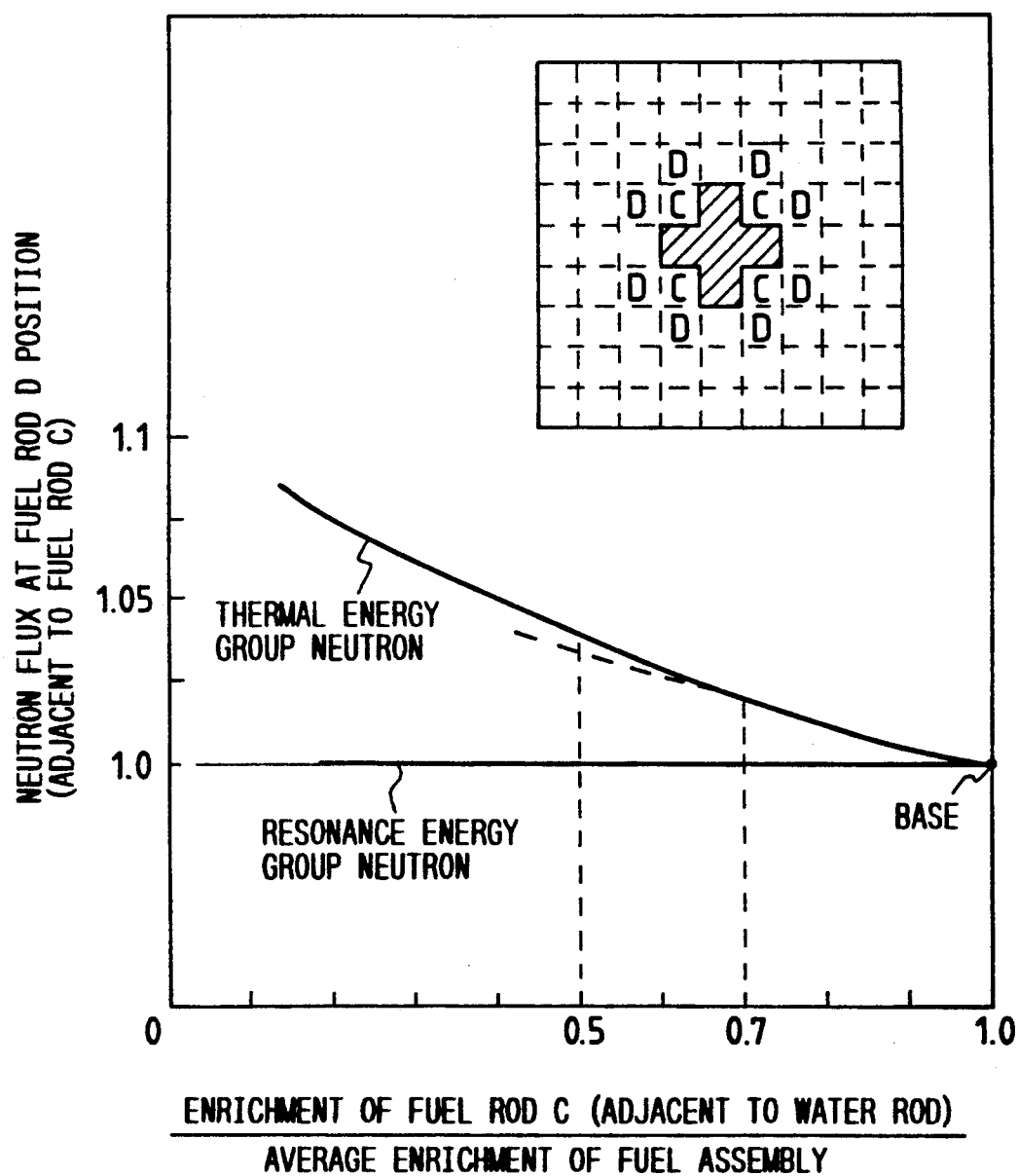
FIG. 6 is a graph representing the effect of fuel enrichment adjacent to the water rod region on distribution of neutron flux.
Figure 7:
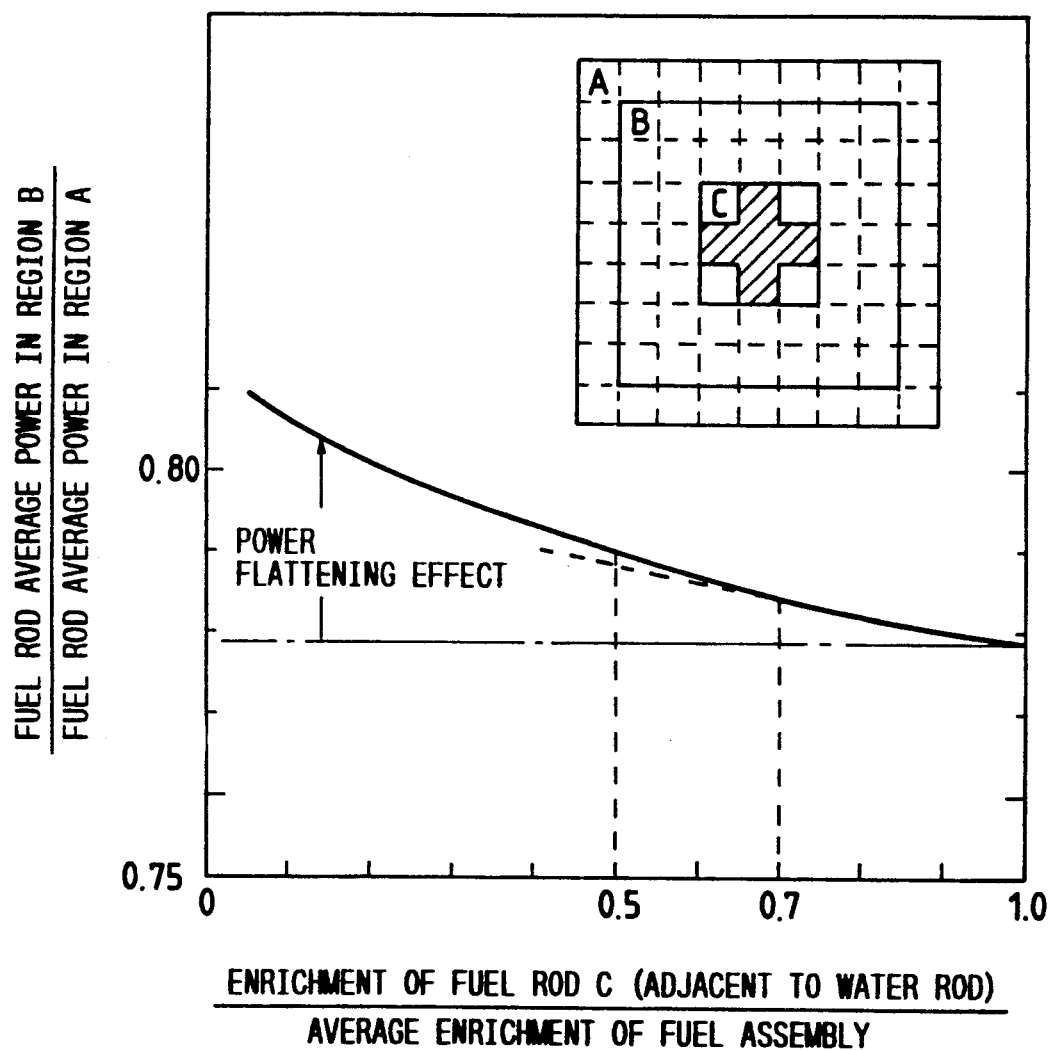
FIG. 7 is a graph representing the effect of fuel enrichment adjacent to the water rod region on flattening of power distribution.

Next, the results of the examination on the effect of enrichment of the fuel rod adjacent to the water rod region on the distribution of the resonance neutron flux and the thermal neutron flux are represented in FIGS. 6 and 7.

When the fuel rod C having low enriched fuel is arranged at the location adjacent to the lower region 12a, the neutron spectrum at the fuel rod D location adjacent to the fuel rod C alters as represented in FIG. 6. That is, the neutron flux of resonance energy groups at the fuel rod D location is not influenced by the enrichment of the fuel rod C. But the neutron flux of thermal energy groups increases linearly when a ratio of the enrichment of the fuel rod C to the cross section average enrichment of the fuel assembly becomes less than 0.7. Especially, the increasing effect of the thermal neutron flux is remarkable in a range of the ratio less than 0.5. As the result, as shown in FIG. 7, the flattening of power distribution in the horizontal direction is achieved at the enrichment fraction of 0.7 or less. Especially, the effect of the flattening is remarkable at the ratio of 0.5 or less.

According to the above described results, the inventors of the present invention found that when the low enriched fuel rod 13 is arranged in a location adjacent to the lower region 12a, the resonance neutron flux in a region of exterior to the location of the fuel rod 13 in the horizontal direction is scarcely influenced with the effect of the location, but the thermal neutron flux is influenced. That is, the thermal neutron flux increases as lowering of the enrichment of the fuel rod 13 and, accordingly, the inventors found that the fuel rod 13 is able to be a substitute for a water rod by lowering the enrichment of the fuel in the fuel rod 13 less than a designated value and arranging at the location adjacent to the lower region 12a, and the substitutional effect becomes remarkable when the ratio of the enrichment of the fuel rod 13 to the horizontal cross section average enrichment of the fuel assembly is preferably equal to 0.7 or less, further preferably, equal to 0.5 or less.

The present invention is based on the above described findings. With arranging the fuel rod 13 at the location adjacent to the lower region 12a and lowering the enrichment of the fuel rod 13 less than a designated value, the thermal neutron flux in the region exterior to the fuel rod 13 in the horizontal direction is further increased by utilizing the synergistic effect with the above described effect of the horizontal cross sectional area of the lower region 12a and contributes to the flattening of power distribution in the horizontal direction.

Lowering of the enrichment of fuel means increasing of the quantity of uranium-238, a fertile material. While as above described, not only the thermal neutron flux but also the resonance neutron flux are increased by setting the horizontal cross sectional area of the lower region 12a properly. Uranium-238 is converted to plutonium-239 by absorbing a neutron of resonance energy group. Therefore, the lowering of the enrichment of the fuel rod 13 to less than a designated value increases uranium-238 and is able to contribute to the control of the reactivity at the beginning of an operation cycle by effective absorbing of neutrons of resonance energy groups, and converted plutonium-239 is able to be used as a fuel at the end of the operation cycle. That is, by lowering the enrichment of the fuel rod 13 to less than a designated value, the fuel rod 13 is able to function both the effect of increasing the thermal neutron flux and the effect of utilization of the resonance neutron flux.

As above described, the preferable embodiment of the present invention is to achieve the increment of the absorbing effect of the resonance neutron flux and the flattening in the horizontal direction of the thermal neutron flux by arranging the water rod having the lower region 12a occupying an area equivalent to at least two fuel rods, and making the enrichment of the fuel rod 13 adjacent to the water rod preferably at most 0.7 of the horizontal cross section average enrichment, especially more preferably at most 0.5.

The results of the examination represented in FIGS. 4 and 5 are on such cases that the fuel rod 13 adjacent to the lower region 12a has the same enrichment as the enrichment of the other fuel rod 11. But when the enrichment of the fuel rod 13 is lower than the horizontal cross section average enrichment of the fuel assembly, the thermal neutron flux is further increased in accordance with the result of the examination as represented in FIGS. 6 and 7. Accordingly, the present invention, in which the enrichment of the fuel rod 13 is lower than the horizontal cross section average enrichment of the fuel assembly, the respective minimum values in the horizontal distribution of both the thermal neutron flux and the resonance neutron flux are located at the region further outside in the horizontal direction of the low enriched fuel rod 13.

Next, the effects brought by the flattening of the thermal neutron flux in the horizontal direction and the increment of the absorption effect of the resonance neutron flux are explained concretely.

The flattening of the thermal neutron flux in a horizontal direction means the increment of the thermal neutron flux in the lower region 12a in FIG. 2 and in the exterior region to low enriched fuel rods 13 in the horizontal direction. And the flattening makes the fuel rods 11 in the exterior region possible to be burnt effectively, and contributes to the improvement of the fuel economy. And, effects of the improvement in the thermal margin and the stability are obtained by the flattening of power distribution in the horizontal direction (local power peaking).

On the other hand, the increment of the absorbing effect of the resonance neutron flux brings the increment of conversion rate of uranium-238 (fertile material) contained in the lower enriched fuel rods 13 to plutonium-239. And the increment yield such effects as follows.

(1) the increment of the reactivity at the end of the operation cycle (2) the control of the reactivity at the beginning of the operation cycle (3) the decrement of the reactivity depletion with the combustion by the (1) and the (2)

The (1) contributes to the improvement of the fuel economy (effect of uranium saving), the (2) contributes to the reducing of the mixing quantity of burnable poisons (for example gadolinia) and accompanying improvement of the fuel economy (effect of uranium saving), and the (3) contributes to the reduction of the differential in the reactivity with other fuel assemblies by the difference of loading period in the nuclear reactor and the reduction of the power peaking in the reactor core. Further, the depletion of the reactivity accompanied with burn up at the lower region of the fuel assembly, wherein the void fraction is small, is larger than the depletion at the upper region. Therefore, the effect of the (3) is remarkable at the lower region of the fuel assembly. Accordingly, enhancing the conversion of uranium-238 to plutonium-239 at the lower region of the fuel assembly achieves the flattening of the burn up distribution in the axial direction of the fuel assembly. And such improvements as reduction of the maximum linear heat generation rate, increment of the reactor shut down margin, increment of the thermal margin such as the improvement in the stability and the scram characteristics, and improvement in the controllability of the excess reactivity are realized.

Figure 8:
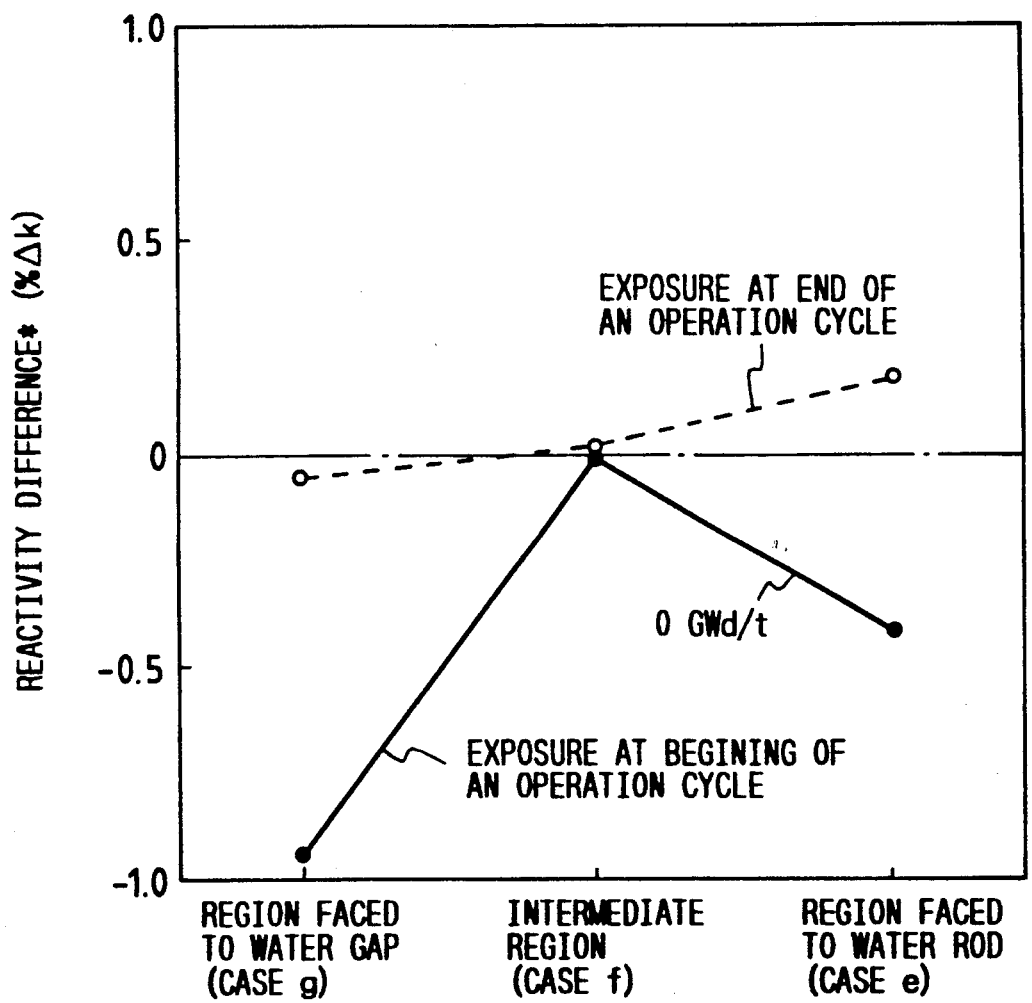
FIG. 8 is a graph representing the relationship between reactivity and location of a fuel rod having low enriched fuel.

In FIG. 8, the result of examination on the above described effects of (1) and (2) depending on the location of the low enriched fuel rods arrangement is represented. In the analysis, the conventional fuel assembly having fuel rods 16 in a lattice arrangement of 8×8 represented in FIG. 9 was used. At the diagonal location of the center of the fuel assembly, two water rods 17 are arranged. In FIG. 8, the case e in the abscissa is the case in which twelve natural uranium fuel rods (fuel rods containing only natural uranium as nuclear fuel) are arranged in the region faced to the water rod 17 in surrounding the water rod 17, the case f is the case in which the twelve natural uranium fuel rods are arranged in the middle region between the water rod 17 and the water gap region 18, and the case g is the case in which the twelve natural uranium fuel rods are arranged in the region faced to the water gap 18, and the characteristics of each of the cases are represented. The average horizontal cross sectional enrichment of the fuel assemblies in all above described cases was same.

In FIG. 8, the vertical axis expresses the reactivity differentials between the reactivity of the respective fuel assembly of the each case and the reactivity of the conventional fuel assembly in which the fuel rods are so arranged as to be same average enrichment (this case is called the case h, hereinafter). That is, the case h does not contain any natural uranium fuel rod. The dashed line indicates the reactivity differentials at the end of the operation cycle, that is, the effect of the (1), and the real line indicates the reactivity differentials at the beginning of the operation cycle, that is, the effect of the (2).

In the case e, the reactivity of the fuel assembly is smaller at the beginning of the operation cycle and larger at the end of the operation cycle than the reactivity in the case h. In the case f, the reactivity of the fuel assembly is almost same as the reactivity in the case h both at the beginning and the end of the operation cycle. In the case g, the reactivity is smaller than the case h more than the case e at the beginning of the operation cycle and is still somewhat smaller than the case h at the end of the operation cycle. In the case h, the reactivity differential is zero.

The above described result reveals following feature. The effect of the (2) (accordingly, the effect of the (3)) becomes large when the natural uranium fuel rods are arranged in the region in which the moderating effect is large as the cases of e and g. The effect of the (1) is scarcely obtained in the case g in which the natural uranium fuel rods are arranged in the region having the largest moderating effect. The reason is that the region faced to the water gap has remarkably high neutron flux of thermal energy groups and the rate of the combustion of the fissile material is high. In other words, the region is suitable for improvement of the fuel economy by being used for the fission reaction of the fissile material rather than the plutonium conversion. On the other hand, the arrangement of natural uranium fuel rods in the region faced to the water rod (the case e) brings not only the enhancing of the plutonium conversion but also relative increasing of the enrichment of the fuel rods arranged in the region facing to the water gap and relative increasing of the reactivity of the fissile material. Accordingly, the improvement of the fuel economy is realized.

As above explained, the inventors of the present invention found that the conversion of uranium-238 to plutonium-239 is possible not only in the region adjacent to the water rod but also the region facing to the water gap, and the arrangement of the low enriched fuel rods in the region adjacent not to the water gap but to the water rod is effective in order to substantially utilize the plutonium conversion. The present invention is based on the findings.

The present invention is, as above described, to utilize the increment of the absorbing effect of the resonance neutron flux and the flattening of the thermal neutron flux in the horizontal direction by the arrangement of the low enriched fuel rods 13 in the region adjacent to the lower region 12a which occupies the area equivalent at least to the two fuel rods at the lower region of the fuel assembly, and the low enrichment is determined as low as preferably at most 0.7 of the horizontal cross sectional average, more preferably at most 0.5, and, consequently, to achieve the increment of the fuel economy, the improvement of the controlability of the reactivity, and the increment of the thermal margin.

Figure 10:
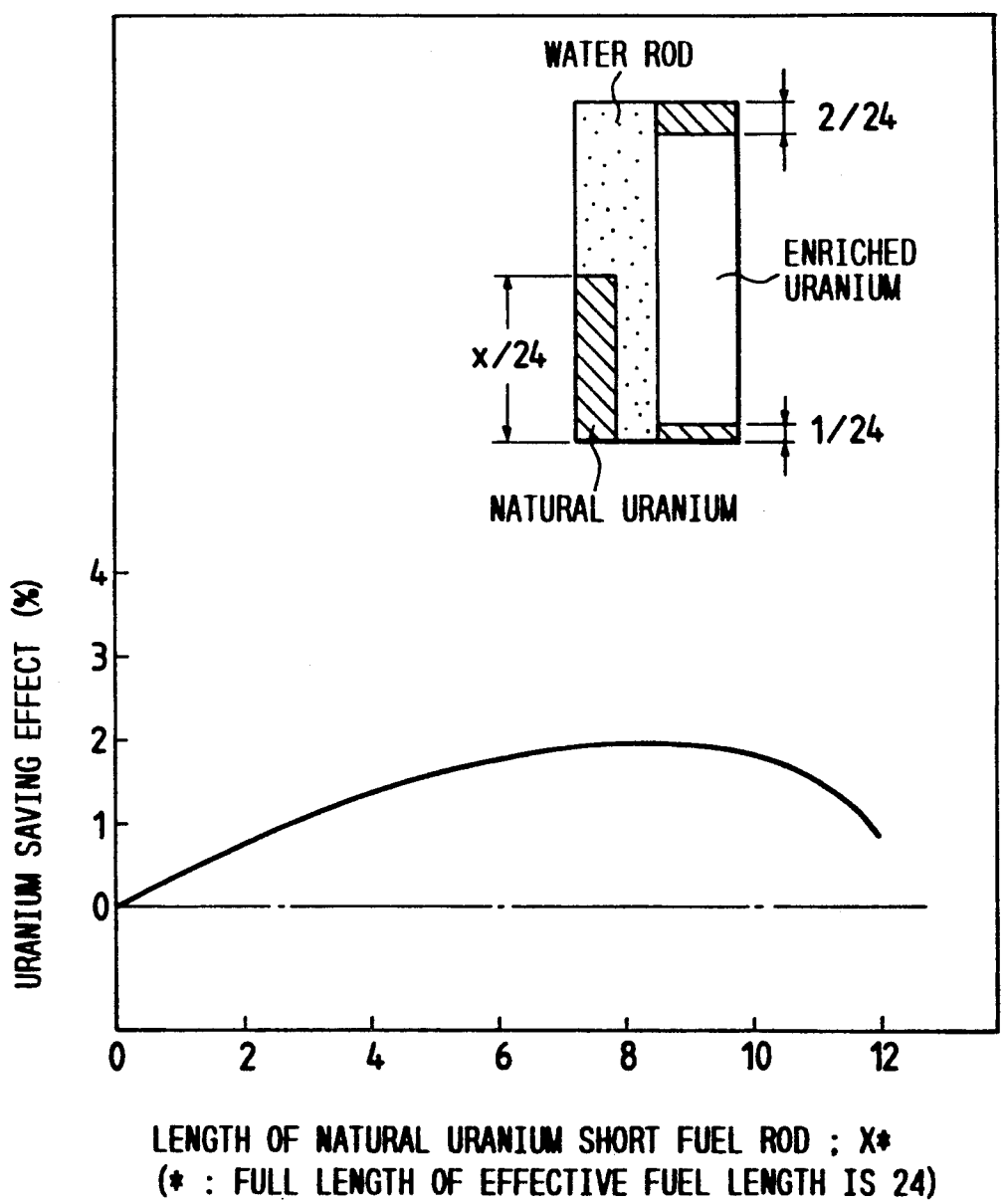
FIG. 10 is a graph representing location, wherein the effect of the present invention is able to influence, in an axial direction of a fuel rod having low enriched fuel.

Next, the location in the axial direction, in which the effect of the present invention influences, of the natural uranium short fuel rod 13 is considered. In FIG. 10, the result of the consideration is shown. In FIG. 10, the abscissa represents the axial length of the short fuel rod 13, and the ordinate represents the effect of uranium savings. The uranium savings effect is expressed by the saving quantity of necessary natural uranium per generation of an unit energy.

The uranium saving effect is obtained by the arrangement of the low enriched fuel rods 13, namely the natural uranium short fuel rods, in the region adjacent to the lower region 12a of the water rod 12 as above described. When the axial length of effective fuel length portion (hereinafter called the second effective fuel length portion) of the natural uranium short fuel rod 13 is in the range of less than nearly 9/24 of the full length in the axial direction of effective fuel length (hereinafter called the first effective fuel length portion) of the fuel rod 11, the uranium saving effect increases with the increment of the length of the second effective fuel length portion of the natural uranium short fuel rod 13. When the length of the second effective fuel length portion exceeds 9/24 of the axial full length of the first effective fuel length portion, the uranium saving effect beings to decrease and the decrement becomes remarkably at the length about 12/24. That is, the natural uranium short fuel rod 13 having the length of the second effective fuel length portion less than ½ of the full length of the first effective fuel length portion reveals the remarkable uranium saving effect, and with the length exceeding ½, the uranium saving effect is not obtained. The reason is that the H/U ratio is optimized at both upper and lower portion of the fuel assembly when the second effective fuel length portion of the natural uranium fuel rod 13 has the length less than ½ of the length of the first effective fuel length portion, and, on the contrary, when the length exceeds ½ of the first effective fuel length portion, the H/U ratio at the upper portion of the fuel assembly becomes too smaller than the optimum ratio. The effective fuel length portion is a region wherein nuclear fuel is inserted in the fuel assembly. The axial full length of the effective fuel length portion is the axial length of the region wherein the nuclear fuel is inserted.

As above described, the inventors of the present invention found that making the length of the lower enriched fuel rod at most the ½ of the first effective fuel length portion of the other fuel rod is effective for ensuring the uranium saving effect, and that making the length of the effective fuel length portion of the short fuel rod 13 about 9/24 of the effective fuel length of the fuel rod is preferable for obtaining the highest uranium saving effect. The present invention is based on the findings, and the length of the second effective fuel length portion of the short fuel rod 13 is determined at most ⅜, preferably 9/24, of the effective fuel length portion length of the fuel rod 11.

Further, in the present invention, although the fuel loading quantity is different between the upper portion and the lower portion of the fuel assembly, the quantity of uranium-235 is almost uniform because the fuel rod having the minimum weight percentage of the fissile material in the horizontal cross section is loaded in the lower portion of the fuel assembly, and as uranium-238 excludes light water as the moderator, the power distribution in the axial direction is not distorted to the lower portion of the fuel assembly.

EMBODIMENT 1

The first embodiment which is one of the embodiments of the present invention is explained referring to FIGS. 11-15.

As shown FIG. 11, the fuel assembly 20 of the first embodiment is composed of a channel box 1 having a square cross section, and a fuel bundle 2 which is inserted into the interior of the channel box. The fuel bundle 2 is provided with an upper tie plate and a lower tie plate which are respectively inserted to the upper end portion and the lower end portion of the channel box 1, a plurality of fuel spacers 5 which are installed in the interior of the channel box 1 with a respective interval in the axial direction, fuel rods 6 and a water rod 7 which penetrate the fuel spacers 5 and are held by the upper and lower tie plates 3 and 4 at the both end portions, short fuel rods 8 which penetrate the fuel spacers 5 at the lower portion of the fuel assembly and are respectively held by the lower tie plate 4 at the lower end portion, and short fuel rods 9 having medium length which penetrate the lower and middle fuel spacers 5 and are respectively held by the lower tie plate 4 at the lower end portion.

Figure 12:
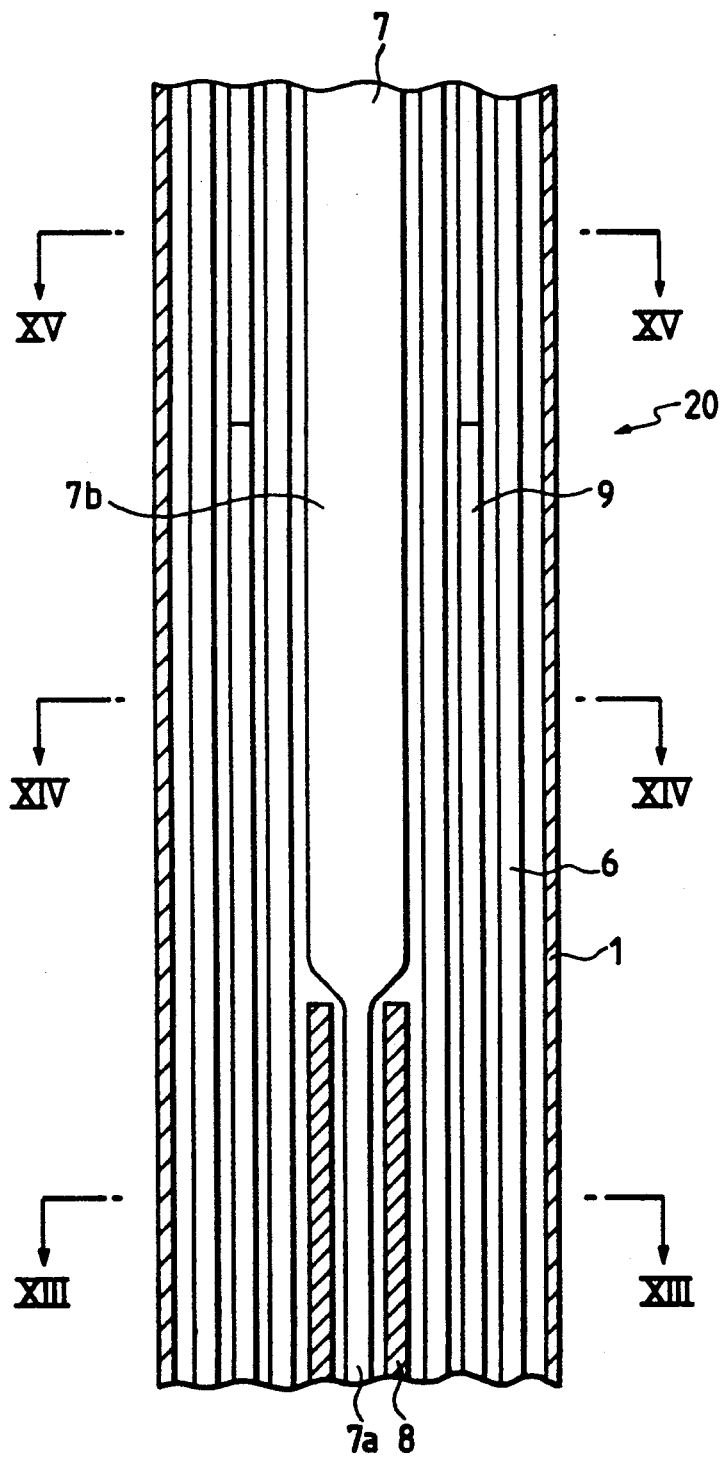
FIG. 12 is a schematic illustration of the effective fuel length region of the fuel assembly in FIG. 11.
Figure 13:
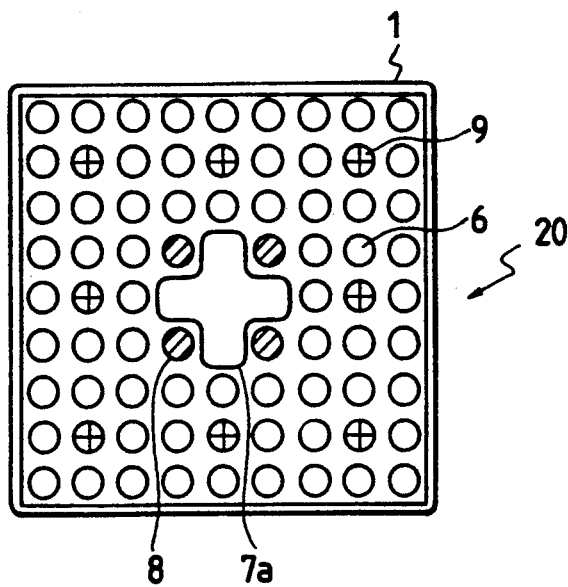
FIGS. 13-15 are respectively XIII—XIII section XIV—XIV section, and XV—XV section in FIG. 12.
Figure 14:
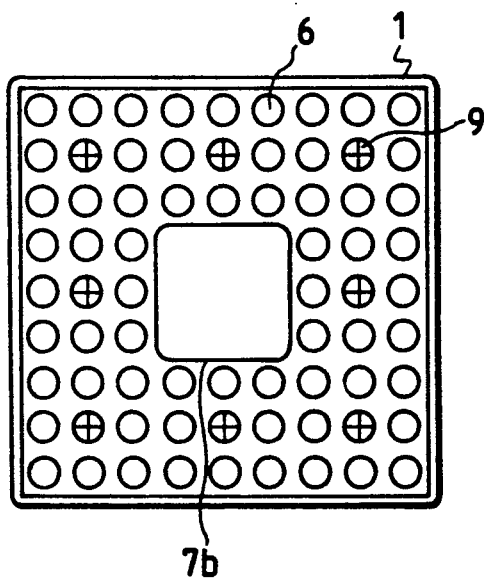
Figure 15:
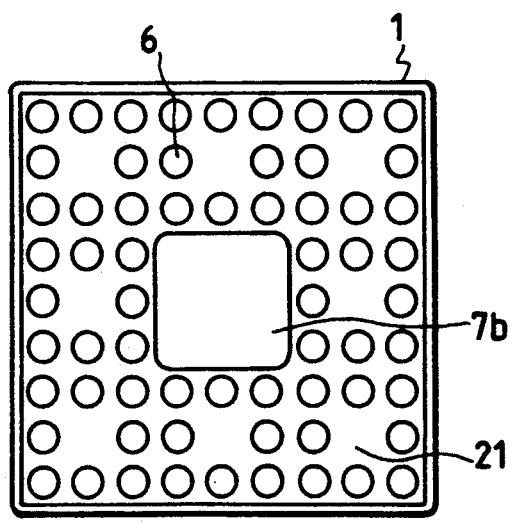

In FIG. 12, the composition of the effective fuel length portion of the fuel assembly, of which cross section are shown in FIGS. 13-15, is represented. The fuel rods 6 and the short fuel rods 8, 9 are arranged in a square lattice of 9×9 lattice, and the water rod 7 is surrounded with the fuel rods and is arranged at the center of the fuel assembly cross section. The lower region 7a of the water rod 7 has a cruciform cross section occupying a region equivalent to five fuel unit cells as shown in FIG. 13, and the upper region 7b has a square cross section occupying a region equivalent to nine fuel unit cells as shown in FIGS. 14 and 15.

The four short fuel rods 8 are arranged in the adjacent region to lower portion 7a beneath the extended portion in the horizontal direction of the upper portion 7b of the water rod 7, that is, at the four corner portions of the central region of 3×3 lattice including the water rod 7 as shown in FIG. 13. The short fuel rod 8 is a fuel rod loaded with natural uranium all through the second effective fuel length portion. The length of the second effective fuel length portion of the short fuel rod 8 is 9/24 of the axial full length of the first effective fuel length portion of the fuel rod 6. The lower portion 7a of the water rod 7 is located at the region from the bottom of the first effective fuel length portion of the fuel rod 6 to 9/24 of the full length of the effective fuel length portion in corresponding to the short fuel rod.

The eight short fuel rods 9 are arranged at the second row from the outer most periphery of the fuel lattice arrangement with a respective desired interval as shown in FIG. 15. The enrichment of the short fuel rod 9 is same as the regular fuel rod 6. The length of the effective fuel length portion (hereinafter called the third effective fuel length portion) of the short fuel rod 9 is 15/24 of the full length of the first effective fuel length portion of the fuel rod 6.

As the result of the composition as above described, the effective fuel length portion in the first embodiment is divided into three regions in the axial direction, each of the region is composed as follows:

(1) The lower region (From the bottom of the first effective fuel length portion to 9/24 of the full length of the first effective fuel length portion): FIG. 13

The fuel rod 6

The lower region 7a having the cruciform cross section (Cross sectional area of the water rod: 9 cm$^2$)

The short fuel rods 8 (4 rods)

The short fuel rods 9 (9 rods)

(2) The middle region (From 9/24 to 15/24 of the full length of the first effective fuel length portion based at the bottom of the first effective fuel length portion): FIG. 14

The fuel rod 6

The upper region 7b having the square cross section (Cross sectional area of the water rod: 14 cm$^2$)

The short fuel rods 9 (9 rods)

(3) The upper region (From 15/24 of the full length of the first effective fuel length portion based on the bottom of the first effective fuel length portion to the top of the first effective fuel length portion): FIG. 15

The fuel rod 6

The upper region 7b having the square cross section

The space 21 above the short fuel rods 9

The enrichment of the fuel rods 6 and the short fuel rod 9 are so adjusted that the horizontal cross sectional average enrichment of the fuel assembly 20 at the lower region (1) including the short fuel rods 8 becomes about 4%.

With the composition as above described, the index of the moderator to the fuel ratio, the H/U ratio, became 4.1 at the upper region (3) (void fraction 70%), and 5.6 at the lower region (1) (void fraction 0%). For comparison, the H/U ratio of the conventional fuel assembly shown in FIG. 9 are 3.3 at the upper region (void fraction 70%), and 5.9 at the lower region (void fraction 0%). According to the present invention, the difference of the H/U ratio between the upper region and the lower region can be reduced almost a half of that of the prior art. That is, the H/U ratio of the whole fuel assembly can be adjusted close to the optimum value, from 4.0 to 5.0. The improvement in the H/U ratio enables the high burn up of the fuel be achieved and the thermal margin be increased by flattening of the power distribution in reactor operation. Further, the burn up and the reactivity difference in operation and at cold shut down are made not so much different between at the upper region and at the lower region of the fuel assembly, and accordingly, the reactor shut down margin can be certainly maintained even though with the fuel assembly having a discharged burn up exceeding 50 GWd/t.

Moreover, according to the present embodiment as being composed as above described, the lower region 7a of the water rod 7 at the lower region (1) occupies the area equivalent to the five fuel unit cells. As the cross sectional average enrichment at the lower region (1) is 4% and the enrichment of the natural uranium of the short fuel rod 8 is about 0.7%, therefore, the ratio of the enrichment of the fuel rods adjacent to the water rod to the cross sectional average enrichment, which is an index of the abscissa in FIGS. 6 and 7, is about 0.18. And, the length of the second effective fuel length portion of the short fuel rod 8 is 9/24 of the fuel length of the first effective fuel length portion of the fuel rod 6. Accordingly, as previously described in the explanation of the theory of the present invention, both the increment of the absorption effect of the resonance neutron flux and the flattening of the thermal neutron flux in the horizontal direction are realized. Therefore, fuel economy is much improved, and further effects such as increment of the stability, improvement in the controllability of the excess reactivity, and increment of the thermal margin are obtained.

EMBODIMENT 2

The second embodiment of the present invention is explained referring to FIGS. from 16 to 18.

The second embodiment is the case that the previously described theory is applied to the fuel assembly having the fuel rods arrangement of 10×10 lattice.

FIGS. from 16 to 18 represent the cross sections at same position as FIGS. from 13 to 15 in the first embodiment. In the drawings, the fuel assembly 30 of the present embodiment comprises the fuel rods 31 arranged in a square lattice of 10×10, the water rod 32 surrounded with the fuel rods 31 and located at the center of the cross section of the fuel assembly, the short fuel rods 33 and 34, and the channel box 35 surrounding a bundle of the fuel rods 31, 33 and 34 and the water rod 32. The water rod 32 has a square horizontal cross section occupying an area equivalent to four fuel unit cells at the lower region 32a as illustrated in FIG. 16, and a cruciform horizontal cross section occupying an area equivalent to the 12 fuel unit cells at the upper region 32b as illustrated in FIGS. 17 and 18.

Figure 16:
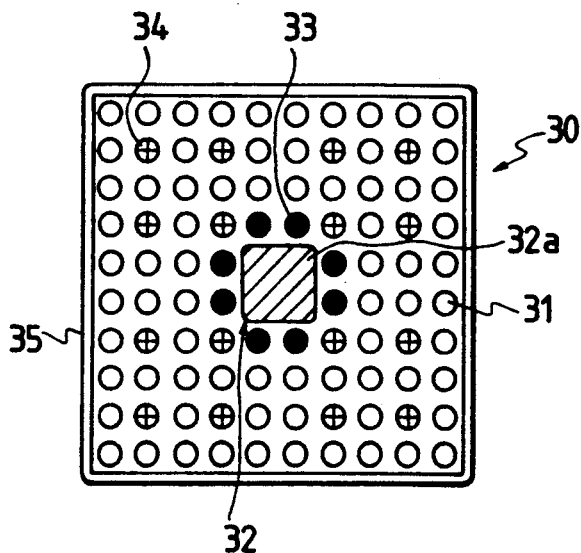
FIGS. 16-18 are as same as FIGS. 13-15 with relation to the second embodiment of the present invention.

The eight short fuel rods 33 are arranged in the region adjacent to the lower region 32a are arranged in the region adjacent to the lower region 32a beneath the extended portion of the upper region 32b of the water rod 32 as illustrated in FIG. 16. The short fuel rod 33 is a fuel rod loaded with natural uranium all through the second effective fuel length portion. The length of the second effective fuel length portion of the short fuel rod 33 is 9/24 of the full length of the first effective fuel length portion of the fuel rod 31. The lower region 32a of the water rod 32 has the length corresponding to the length of the short fuel rod 33.

Figure 17:
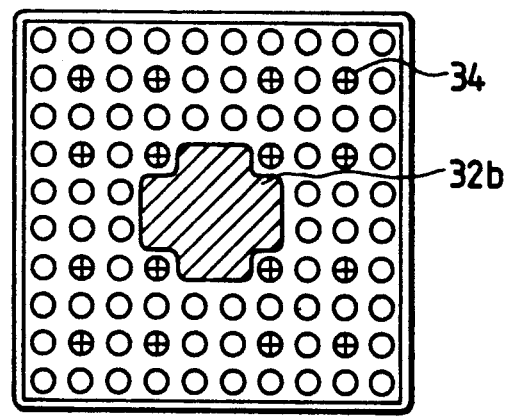
Figure 18:
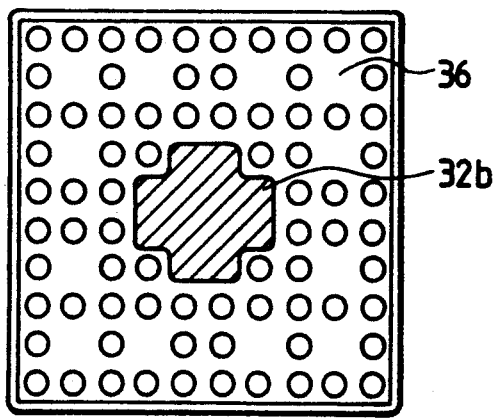

The total sixteen short fuel rods 34 are arranged in the fuel assembly in a manner that 12 rods are in the second row from the outermost periphery of the lattice arrangement with a constant interval from each other and 4 rods at the corner locations of the 4×4 central region as illustrated in FIGS. 16 and 17.

The enrichment of the short fuel rod 34 is same as the fuel rod 31. The length of the third effective fuel length portion of the short fuel rod 34 is 15/24 of the full length of the first effective fuel length portion of the fuel rod 31.

As the result of the composition as above described, the composition of the effective fuel length portion in the second embodiments divided into following three regions in the axial direction.

(1) The lower region (From the bottom of the first effective fuel length portion of the fuel rod 31 to 9/24 of the full length of the first effective fuel length): FIG. 16
The fuel rods 31
The lower region 32a having the square horizontal cross section (The cross sectional area of the water rod; 3.6 cm²)
The short fuel rods 33 (8 rods)
The short fuel rods 34 (16 rods)

(2) The middle region (From 9/24 to 15/24 of the full length of the first effective fuel length portion based on the bottom of the first effective fuel length portion): FIG. 17
The fuel rods 31
upper region 32b having the cruciform horizontal cross section (The cross sectional area of the water rod; 13.5 cm²)
The short fuel rods 34 (12 rods)

(3) The upper region (From 15/24 of the full length of the first effective fuel length portion based on the bottom of the first effective fuel length portion to the top of the first effective fuel length portion): FIG. 18
The fuel rods 31
The upper region 32b having the cruciform horizontal cross section
The space 36 above the short fuel rods 34

The enrichment of the fuel rods 31 and the short fuel rod 34 are so adjusted that the horizontal cross sectional average enrichment of the fuel assembly 30 becomes about 5% at the lower region (1) including the short fuel rods 33.

With the composition as above described, the index of the moderator to the fuel ratio, the H/U ratio, became 4.3 at the upper region (3) (void fraction 70%) and 4.9 at the lower region (1) (void fraction 0%). In comparison with the H/U ratio of the conventional fuel assembly shown in FIG. 9 of 3.3 at the upper region (void fraction 70%) and 5.9 at the lower region (void fraction 0%), the difference of the H/U ratio between the lower region and the upper region can be reduced less than a half of the conventional fuel assembly in the second embodiment. That is, the H/U ratio of the whole fuel assembly becomes further close to the optimum value, from 4.0 to 5.0. As the result, in spite of the increment of the enrichment to 5% in the second embodiment, difference of the reactivity in reactor operation and the reactivity at cold shut down is reduced to about 3.0%Δk (reduced about 50% from the conventional fuel having enrichment of about 3%) between at the upper region and at the lower region of the fuel assembly.

The above described improvement in the H/U ratio enables the power distribution in operation be flattened, and, further, the burn up and the reactivity difference in operation and at cold shut down are made not so much different between at the upper region and at the lower region of the fuel assembly, and accordingly, the reactor shut down margin can be certainly maintained even though with the fuel having a discharged burn up exceeding 50 GWd/t And, the loading quantity of the fuel can be increased by 3% than the conventional fuel without sacrificing the coolant flow path of the two phase flow and causing increment of the pressure loss, and, accordingly, the fuel economy is improved.

Further, according to the second embodiment as being composed as above described, the lower region 32a at the lower region (1) occupies the area equivalent to the four fuel unit cells. The cross sectional average enrichment at the lower region (1) is 5%, and the enrichment of the natural uranium contained in the short fuel rod 33 is about 0.7%. Therefore, the ratio of the enrichment of the fuel rods adjacent to the water rod to the cross sectional average enrichment, which is an index of the abscissa in FIGS. 6 and 7, is about 0.14. and, the length of the second effective fuel length portion of the short fuel rod 33 is 9/24 of the full length of the first effective fuel length portion of the fuel rod 31. Accordingly, both the increment of the absorption effect of the resonance neutron flux and the flattening of the thermal neutron flux in horizontal direction are realized. Accordingly, fuel economy is remarkably improved, and further effects such as increment of the stability, improvement in the controllability of the reactivity, and increment of the thermal margin are obtained.

EMBODIMENT 3

Figure 19:
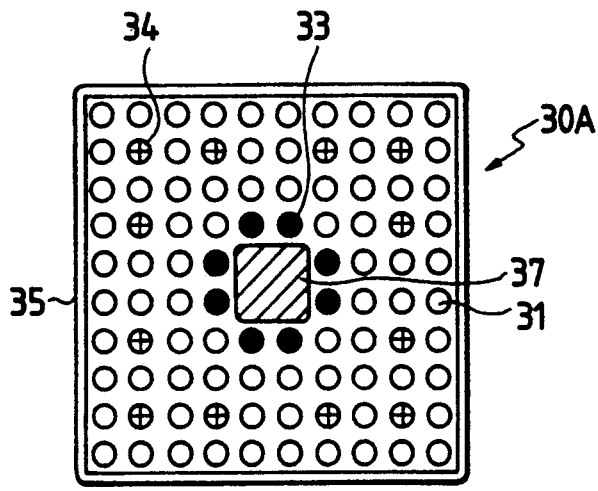
FIGS. 19-21 are as same as FIGS. 13-15 with relation to the third embodiment of the present invention.
Figure 20:
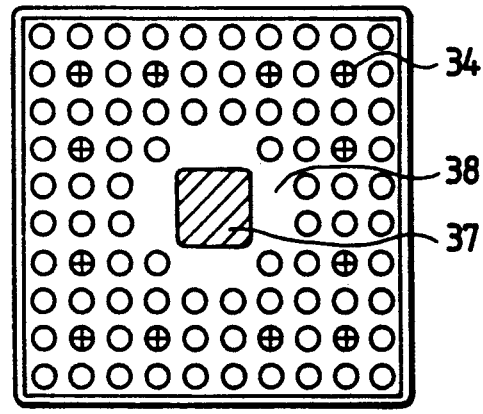
Figure 21:
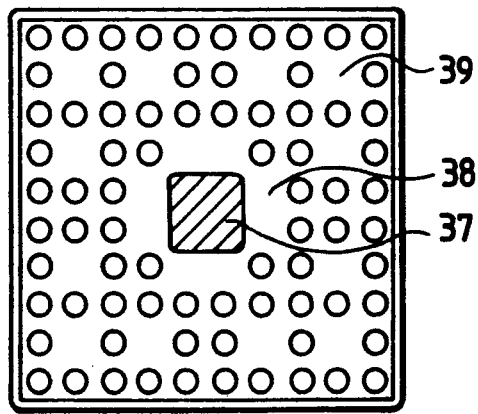

The third embodiment of the present invention is explained referring to FIGS. 19-21.

In the figures, the same numerals are assigned to same members in FIGS. 16-18.

The third embodiment is the case in which the water rod 37 having an uniform cross section all through the axial direction is arranged in same fuel assembly as the second embodiment except the shape of the water rod. That is, in the fuel assembly 30A of the third embodiment, the water rod 37 has an uniform square cross section occupying an area equivalent to the four fuel unit cells in the axial direction. The short fuel rods 33 being loaded with natural uranium all through the region in the second effective fuel length portion are arranged adjacent to the water rod 37 at the lower region from the bottom of the first effective fuel length portion to 9/24 of the full length of the first effective fuel length portion of the fuel rod 31. In the horizontal cross section of the middle region as shown in FIG. 20, the space 38 is formed at the location corresponding to the upper portion of the short fuel rod 33. In the horizontal cross section of the upper region as shown in FIG. 21, the space 38 is formed at the location corresponding to the upper portion of the short fuel rod 34. Other composition of the third embodiment is same as the second embodiment.

In accordance with the third embodiment, the area of the coolant flow path in the fuel assembly can be increased more than the second embodiment at the middle region (2) and the upper region (3) by the space 38. And, as the space 38 locates at the place adjacent to the water rod 37 and has less surrounding heating elements, the void fraction is small and same moderating effect as the water rod is obtained.

Accordingly, same effects as the second embodiment can be obtained by the third embodiment and, further, the pressure loss can be decreased because of the increment of the coolant flow path by the space 38.

EMBODIMENT 4

Figure 22:
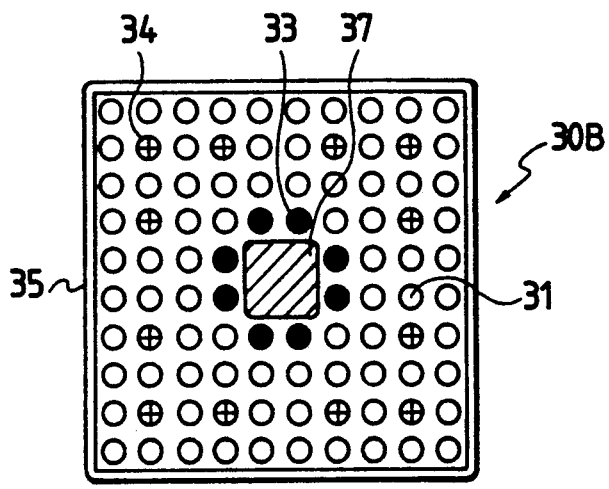
FIGS. 22-24 are as same as FIGS. 13-15 with relation to the fourth embodiment of the present invention.
Figure 23:
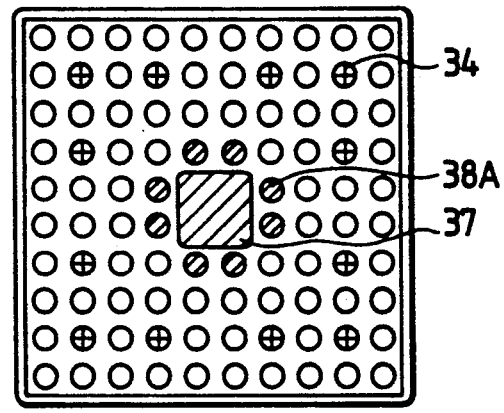
Figure 24:
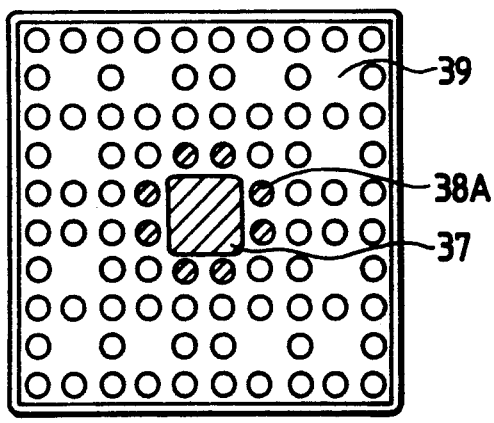

The fourth embodiment of the present invention is explained referring to FIGS. 22-24. In the figures, same numerals are assigned to the same members in FIGS. 19-21.

The fuel assembly 30B of the fourth embodiment is the assembly in which the solid moderators 38A are arranged in the upper portion (the space 38) of the short fuel rods 33 adjacent to the water rod in the third embodiment.

In accordance with the fourth embodiment, the hydrogen density at the upper region can be increased more than the second and the third embodiments. Accordingly, the difference of the H/U ratio between the upper region and the lower region of the fuel assembly can be reduced further.

EMBODIMENT 5

The fifth embodiment of the present invention is explained referring to FIGS. 25-28. In the figures, same numerals are assigned to the same members in FIGS. 12-15. The present embodiment is the case using a channel box having thin wall at the upper region and thick wall at the corners.

Figure 25:
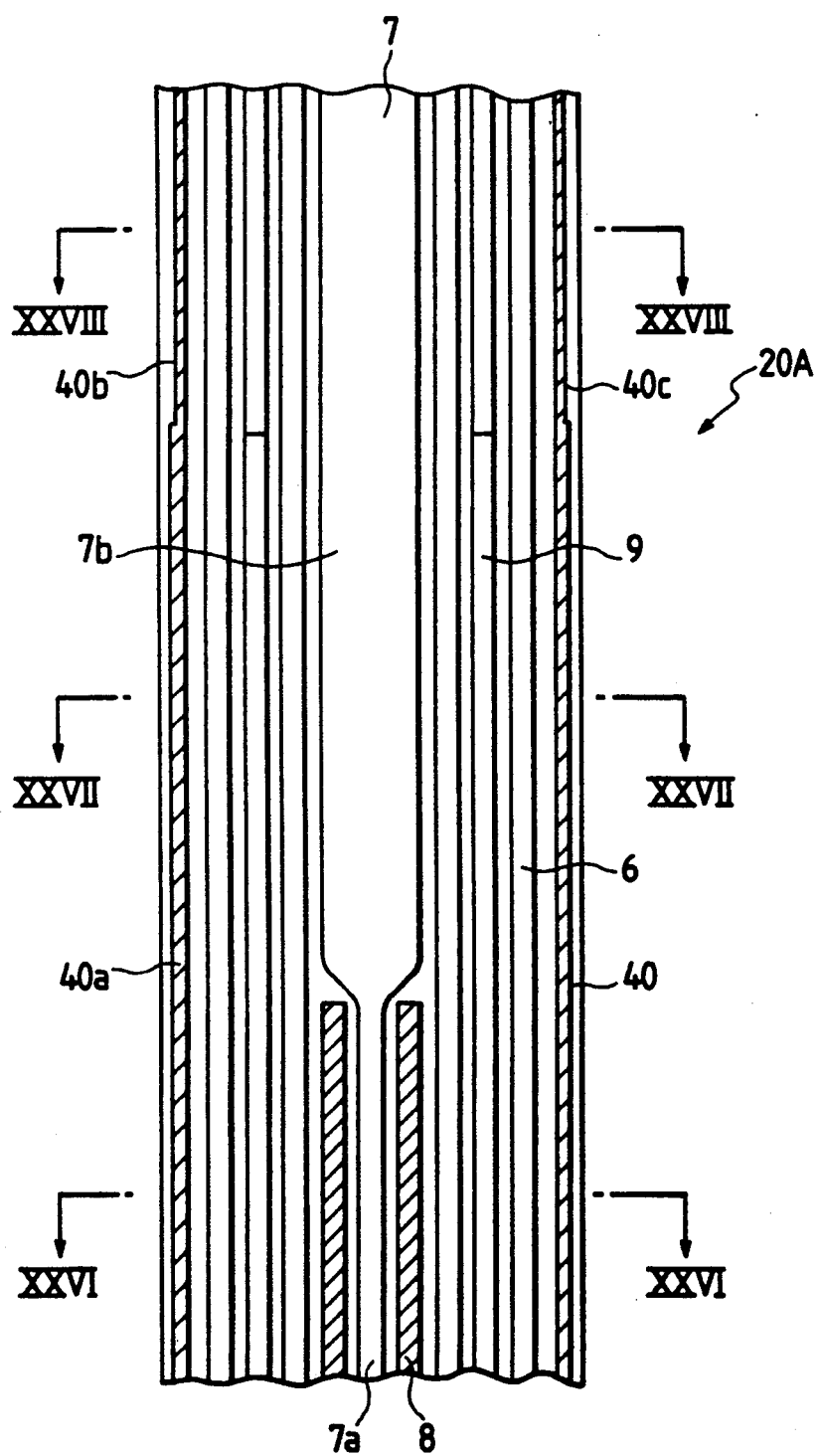
FIG. 25 is a schematic illustration of the effective fuel length region of the fuel assembly in the fifth embodiment of the present invention.
Figure 26:
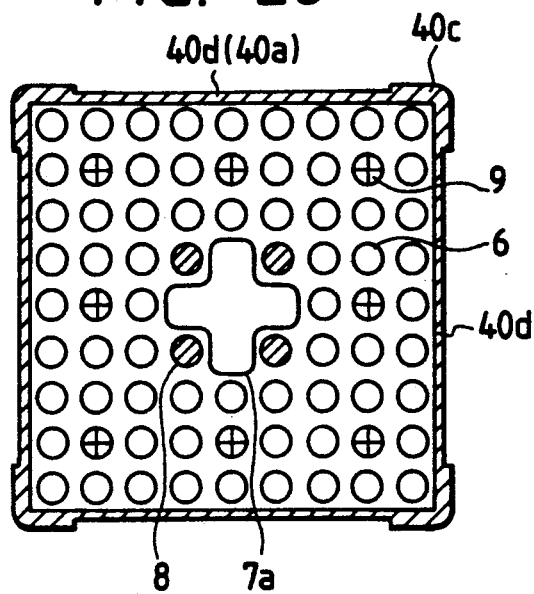
FIGS. 26-28 are respectively XXVI—XXVI section, XXVII—XXVII section, and XXVIII—XXVIII section in FIG. 25.
Figure 27:
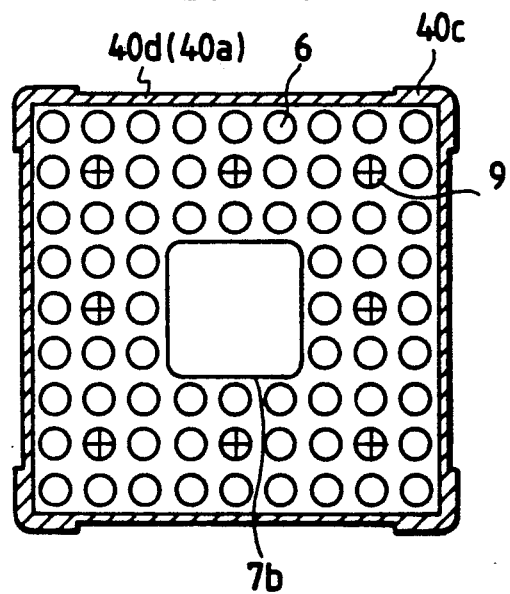
Figure 28:
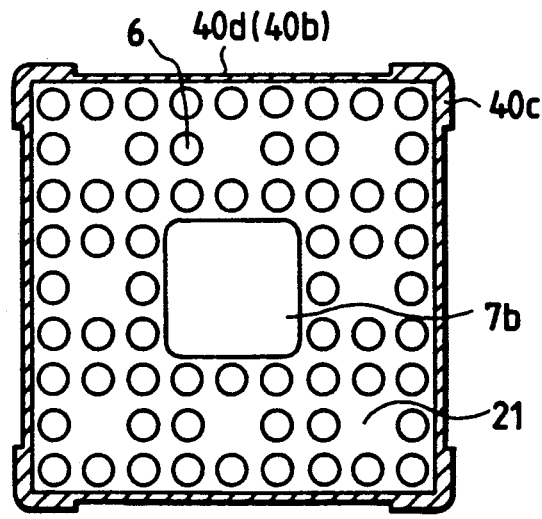

That is, the fuel assembly 20A of the fifth embodiment has the channel box 40, which has a thinner wall 40b at the upper region than the wall 40a at the lower region as shown in FIG. 25. And the channel box 40 has thicker wall 40c at the corners of the cross section than the other portion 40d as shown in FIGS. 26-28. The channel box having thick wall at the corners of the cross section is disclosed in JP-B-1-13075 (1989). The change in wall thickness as above described is not at the corners 40c but at the thin portion 40d. The other composition of the fifth embodiment is same as the first embodiment. As the result, the fuel assembly 20A including the channel box 40 can be separated into the three regions as following;

(1) The lower region (From the bottom of the first effective fuel length portion of the fuel rod 6 to 9/24 of the full length of the first effective fuel length portion): FIG. 26

The fuel rods 6

The lower region 7a having the cruciform cross section
 (The cross sectional area of the water rod; 9 cm2)

The short fuel rods 8 (4 rods)

The short fuel rods 9 (8 rods)

The lower portion 40a having an average wall thickness of 100 mil (The channel box 40)

(2) The middle region (From 9/24 to 15/24 of the full length of the first effective fuel length portion based on the bottom of the first effective fuel length portion): FIG. 27

The fuel rods 6

The upper region 7b having the square cross section
 (The cross sectional area of the water rod; 14 cm$^2$)

The short fuel rods 9 (8 rods)

The lower portion having an average wall thickness of 100 mil (3) The lower region (From 15/24 of the full length of the first effective fuel length portion based on the bottom of the first effective fuel length portion to the top of the first effective fuel length portion): FIG. 28

The fuel rods 6

The upper region 7b having the square cross section

The space 21 above the short fuel rods 9

The upper portion 40b having an average wall thickness of 75 mil (The channel box 40)

The channel box 40 having thin wall at the upper region and the thick wall at the corners causes a distribution in the saturated water region at the exterior of the channel box between the upper region and the lower region. That is, as the upper region of the channel box has relatively smaller restriction in strength than the lower region, thinner wall can be adoptable. And by replacing a part of the structural material at the upper region of the channel box with moderator, the both effects of reduction of useless neutron absorption and of increment of the saturated water region at the upper region can be obtained. The thick wall at the corners of the channel box has a function to make the adoption of the thin wall easier for the channel box.

In accordance with the fifth embodiment, the moderator to fuel ratio at the upper region (void fraction 70%) can be increased further by 0.15, and the difference of the H/U ratio between the upper region and the lower region can be decreased. Accordingly, the difference in the reactivity at the upper region between in operation and at shut down is decreased about 1.2%Δk and the reactor shut down margin is improved further.

EMBODIMENT 6

Finally, an example of the conceptual design of the reactor core being composed of the fuel assemblies of the first embodiment is explained.

Figure 29:
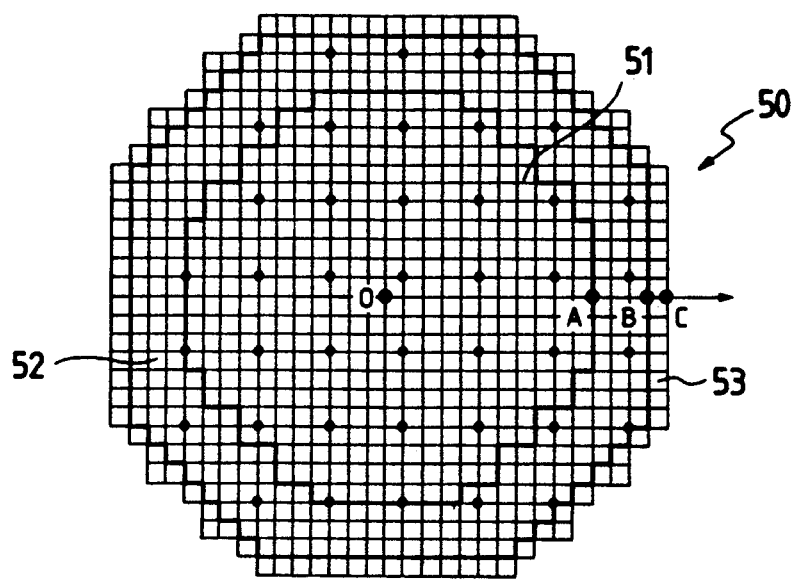
FIG. 29 is a top view of the reactor core composed of the fuel assemblies of the present invention.
Figure 30:
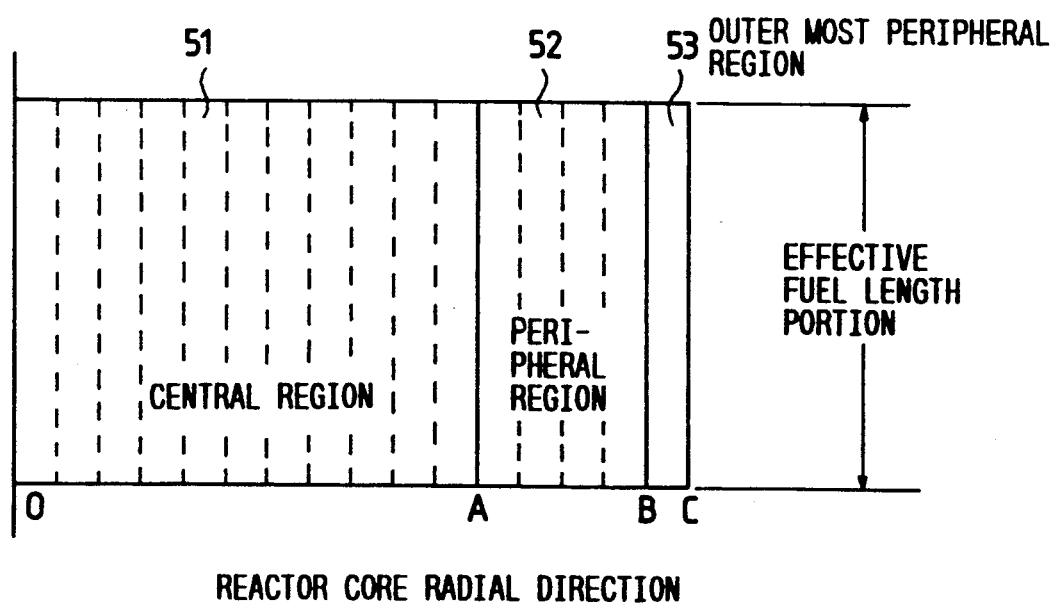
FIG. 30 is a schematic vertical section of the reactor core in FIG. 29.

As shown in FIGS. 29 and 30, the reactor core 50 is composed of the three regions, namely, the central region 51, the peripheral region 52, and the outer-most peripheral region 53. The fuel assemblies relating to the first embodiment are loaded into the central region 51 and the peripheral region 52. The fuel assembly relating to the first embodiment has a small difference in the H/U ratio in the axial direction, and as the result, the reactor shut down margin is improved. Accordingly, the ratio of new fuel assemblies can be increased in the central region 51 of the reactor core, where remarkably contributes to the reactivity. That is, where changing the fuel assemblies, the new fuel assemblies of the first embodiment can be loaded so as to be more in the central region 51 than in the peripheral region 52. Therefore, for instance, the fuel economy can be improved further by adopting three batch dispersed loading method for the central region 51 and four batch dispersed loading method for the peripheral region 52 of the reactor core. The reactor core 50 can be loaded with any of fuel assemblies from the second embodiment to the fifth embodiment instead of the fuel assemblies of the first embodiment.

In the above described embodiments, uranium is used as the fissile material, but same effect is realized with the mixture of uranium and plutonium.

Moreover, in the above mentioned embodiments, the water rod is used in the fuel assembly, but same effect is realized with a solid moderating rod containing solid moderating material such as zirconium hydride etc. having a high hydrogen density and a small neutron absorption cross section, instead of the water rod. Further, same effect is realized with using plutonium and reprocessed uranium recovered from spent fuels as the low enriched fuel rods.

In accordance with the present invention, the moderators, the fissile materials and the fertile materials are arranged optimally in the axial and the radial direction in the fuel assembly and, therefore, the ratio of the moderator to the fuel comes to close the optimum value at all through the location in the fuel assembly including the lower region, and as the result, the increment of the absorption effect of the resonance neutron flux and the flattening of the thermal neutron flux in the radial direction are realized and the fuel economy is increased. Further, the controllability of the excess reactivity is improved and the thermal margin is increased.

What is claimed is:

1. A fuel assembly comprising:
a plurality of first fuel rods,
a means for moderating material having a larger cross sectional area in an upper region than a lower region in an axial direction of the fuel assembly and being surrounded with the first fuel rods, and
at least one second fuel rod having a lower enrichment than a cross sectional average enrichment of the fuel assembly and being arranged in locations adjacent to the lower region of the means for moderating material,
wherein a width of the horizontal cross sectional area at the lower region of said means for moderating material is so set that minimum values of both thermal neutron flux and resonance flux in a vertical direction to the axis of the fuel assembly are located in an outer region with respect to the location of said second fuel rod in the vertical direction to the axis of the fuel assembly, and
wherein the enrichment of said second fuel rod is at most 0.7 of the horizontal cross sectional average enrichment of the fuel assembly.

2. A fuel assembly as claimed in claim 1, wherein the horizontal cross sectional area at the lower region of said means for moderating material is equivalent to a sum of horizontal cross sectional areas of at least two of said first fuel rods.

3. A fuel assembly as claimed in claim 1, wherein the enrichment of said second fuel rod is at most 0.5 of horizontal cross sectional average enrichment of said fuel assembly.

4. A fuel assembly as claimed in claim 1, wherein said second fuel rod contains natural uranium.

5. A fuel assembly as claimed in claim 1, wherein said second fuel rod is a short fuel rod arranged at a location adjacent to the lower region of said means for moderating material.

6. A fuel assembly as claimed in claim 5, wherein the axial length of effective fuel length portion of said short fuel rod is at most a half of the axial full length of an effective fuel length portion of said first fuel rod.

7. A fuel assembly as claimed in claim 1, wherein said means of moderating material is a water rod having a larger horizontal cross sectional area at the upper region than the area at the lower region.

8. A fuel assembly as claimed in claim 1, wherein a plurality of said second fuel rods is provided.

9. A fuel assembly comprising
a plurality of first fuel rods,
a means for moderating material surrounding with said first fuel rods, and
a plurality of second fuel rods arranged at a location adjacent to said means for moderating material,
the enrichment of said second fuel rod is set at most 0.7 of a horizontal cross sectional average enrichment of said fuel assembly.

10. A fuel assembly as claimed in claim 9, wherein said means of moderating material comprises a water rod having a uniform horizontal cross sectional area in all through the axial direction and a coolant flow path surrounding the upper region of said water rod.

11. A fuel assembly as claimed in claim 9, wherein said means of moderating material comprises a water rod having a uniform horizontal cross sectional area in all through the axial direction and a plurality of solid moderating rods surrounding the upper region of said water rod.

12. A fuel assembly as claimed in claim 9, wherein the horizontal cross sectional area of said moderating material is so set that the minimum values of both thermal neutron flux and resonance neutron flux in a vertical direction to the axis of the fuel assembly are located in an outer region with respect the location of said second fuel rod in the vertical direction to the axis of the fuel assembly.

13. A fuel assembly as claimed in claim 9, wherein the horizontal cross sectional area of said moderating material is set larger at an upper region than the area at a lower region in the axial direction, and said second fuel rods are arranged in locations adjacent to the lower region of said means for moderating material.

14. A fuel assembly as claimed in claim 9, wherein said second fuel rod contains natural uranium.

15. A fuel assembly as claimed in claim 9, wherein the enrichment of said second fuel rods is set at most 0.5 of the horizontal cross sectional average enrichment of said fuel assembly.

16. A fuel assembly comprising:
a plurality of first fuel rods,
a means for moderating material having a larger horizontal cross sectional area at an upper region in an axial direction than the area at a lower region and being surrounded with said first fuel rods, and
a plurality of second fuel rods having lower enrichment than a horizontal cross sectional average enrichment of said fuel assembly and being arranged at a location adjacent to said means for moderating,
wherein said means for moderating material comprises a water rod having a cruciform horizontal cross section occupying an area equivalent to five fuel unit cells at the lower region, and said second fuel rods are arranged at four denting locations formed by the cruciform horizontal cross section at the lower region of the water rod, and
wherein the enrichment of said second fuel rods is at most 0.7 of the horizontal cross sectional average enrichment of said fuel assembly.

17. A fuel assembly as claimed in claim 16, wherein the enrichment of fuel in said second fuel rods is at most 0.5 of the horizontal cross sectional average enrichment of said fuel assembly.

18. A fuel assembly comprising:
a plurality of first fuel rods,
a means for moderating material having a larger cross sectional area in an upper region than a lower region in an axial direction and being surrounded with the first fuel rods,
a plurality of second fuel rods having a lower enrichment than a cross sectional average enrichment of the fuel assembly and being arranged in a location adjacent to the lower region of the means for he moderating material, and
a channel box surrounding said first fuel rods, said second fuel rods, and said means moderating material,
wherein a width of the horizontal cross sectional area at the lower region of said means for moderating material is so set that minimum values of both thermal neutron flux and resonance neutron flux in a vertical direction to the axis of the fuel assembly are located in an outer region with respect to the location of said second fuel rods in the vertical direction to the axis of the fuel assembly, and the wall thickness of said channel box is selected as thinner at the upper region in the axial direction than at the lower region, and as thicker at corners than any other location, and
wherein the enrichment of said second fuel rods is at most 0.7 of the horizontal cross sectional average enrichment of said fuel assembly.

19. A fuel assembly comprising:
a plurality of first fuel rods,
a means for moderating material having a larger cross sectional area in an upper region than in a lower region in an axial direction and being surrounded with the first fuel rods,
at least one second fuel rod having a lower enrichment than a cross sectional average enrichment of the fuel assembly an being arranged in a location adjacent to the lower region in the axial direction of the means for the moderating material, and
a means for controlling neutron flux installed in a region, wherein the lower region of said means for moderating material is located, in order to locate minimum values of both thermal neutron flux and resonance neutron flux in a vertical direction to the axis of the fuel assembly at an outer region with respect to the location of said second fuel rod in the vertical direction to the axis of the fuel assembly, and
wherein the enrichment of said second fuel rods at most 0.7 of the horizontal cross-sectional average enrichment of said fuel assembly.

20. A reactor core of a nuclear reactor loaded with a plurality of fuel assemblies, wherein said fuel assembly comprises:
a plurality of first fuel rods;
a means for moderating material having a larger cross sectional area in an upper region than in a lower region in an axial direction and being surrounded with the first fuel rods, and
at least one second fuel rod having a lower enrichment than a cross sectional average enrichment of the fuel assembly and being arranged in a location adjacent to the lower region of the means for the moderating material,
wherein the horizontal cross sectional area at the lower region of the means for moderating material is set so as to locate minimum values of both thermal neutron flux and resonance neutron flux in a vertical direction to the axis of the fuel assembly at an outer region with respect to the location of said second fuel rod in the vertical direction to the axis of the fuel assembly, and
wherein the enrichment of said second fuel rod is at most 0.7 of the horizontal cross sectional average enrichment of said fuel assembly.

21. A reactor core of a nuclear reactor as claimed in claim 20, wherein the reactor core has at least a central region and a peripheral region, and said fuel assemblies are arranged more in the central region than in the peripheral region.

22. A reactor core of a nuclear reactor as claimed in claim 20, wherein the reactor core has at least a central region and a peripheral region, and said fuel assemblies are loaded in the central region by three batches dispersion method and in the peripheral region by four batches dispersion method.

23. A loading method of fuel assemblies in a reactor core of a nuclear reactor having at least a central region and a peripheral region, wherein respective ones of said fuel assemblies comprise:

a plurality of first fuel rods, a means for moderating material having a larger cross sectional area in upper region than in a lower region in an axial direction and being surrounded with the first fuel rods, and at least one second fuel rod having a lower enrichment than a cross sectional average enrichment of the fuel assembly and being arranged in a location adjacent to the lower region of the means for the moderating material, wherein the horizontal cross sectional area at the lower region of the means for moderating material is set so as to locate minimum values of both thermal neutron flux and resonance neutron flux in a vertical direction to the axis of the fuel assembly at an outer region with respect to the location of said second fuel rod in the vertical direction to the axis of the fuel assembly, wherein said fuel assemblies are loaded more in the central region than in the peripheral region, and wherein the enrichment of said second fuel rod is at most 0.7 of the horizontal cross sectional average enrichment of said fuel assembly.

24. A loading method of fuel assemblies in a reactor core of a nuclear reactor as claimed in claim 23, wherein said fuel assemblies are loaded in the central region by three batches dispersion method and in the peripheral region by four batches dispersion method.

* * * * *